United States Patent
Tiegs

(10) Patent No.: US 9,803,857 B2
(45) Date of Patent: Oct. 31, 2017

(54) APPARATUS AND METHODS FOR REDUCING WOOD BURNING APPARATUS EMISSIONS

(76) Inventor: Paul E. Tiegs, Brush Prairie, WA (US)

( * ) Notice: Subject to any disclaimer, the term of this patent is extended or adjusted under 35 U.S.C. 154(b) by 2375 days.

(21) Appl. No.: 12/646,939

(22) Filed: Dec. 23, 2009

(65) Prior Publication Data

US 2010/0186645 A1 Jul. 29, 2010

Related U.S. Application Data

(60) Provisional application No. 61/140,830, filed on Dec. 24, 2008.

(51) Int. Cl.
*F23G 7/06* (2006.01)
*F23J 11/00* (2006.01)
*F23L 7/00* (2006.01)

(52) U.S. Cl.
CPC .............. *F23G 7/065* (2013.01); *F23J 11/00* (2013.01); *F23L 7/007* (2013.01); *F23J 2219/00* (2013.01); *F23J 2900/11001* (2013.01); *F23L 2900/07004* (2013.01); *Y02E 20/344* (2013.01)

(58) Field of Classification Search
USPC ................. 110/185, 210, 212, 214, 297, 345
See application file for complete search history.

(56) References Cited

U.S. PATENT DOCUMENTS

| | | |
|---|---|---|
| 2,845,882 A | 8/1958 | Bratton |
| 3,043,425 A | 7/1962 | Herbert et al. |
| 3,458,634 A | 7/1969 | Pauletta |
| 3,496,890 A | 2/1970 | La Rue |
| 3,806,322 A | 4/1974 | Tabak |
| 3,817,716 A | 6/1974 | Betz |
| 3,887,336 A * | 6/1975 | Hutchinson et al. ......... 110/185 |
| 4,054,418 A | 10/1977 | Miller et al. |
| 4,107,271 A | 8/1978 | Atsukawa et al. |
| 4,138,220 A | 2/1979 | Davies et al. |
| 4,213,947 A | 7/1980 | Fremont et al. |
| 4,249,509 A | 2/1981 | Syme |
| 4,319,556 A | 3/1982 | Schwartz et al. |
| 4,385,031 A | 5/1983 | Fratzer et al. |
| 4,385,032 A | 5/1983 | Fratzer et al. |
| 4,422,437 A | 12/1983 | Hirschey |

(Continued)

OTHER PUBLICATIONS

International Preliminary Report on Patentability, dated Mar. 21, 2011, in re Application Ser. Nr. PCT/US09/69534 (co-pending PCT application of Applicant).

*Primary Examiner* — David J Laux
(74) *Attorney, Agent, or Firm* — Rylander & Associates PC; Kurt M. Rylander; Mark E. Beatty

(57) ABSTRACT

An embodiment is an emissions reduction system for exhaust gases. The emissions reduction system includes a reaction chamber with one or more parallel flow tubes. Each parallel flow tube includes a heating element to heat exhaust gases to oxidize PICs and other pollutants contained in and/or carried by the exhaust gases. The reaction chamber may also include an adjustable bypass for the exhaust gases to variably bypass the parallel flow tubes. The reaction chamber may further include an oxidizing agent injector to improve the oxidation of the PICs and other pollutants in the reaction chamber. The emissions reduction system of an embodiment may further include a catalyst bed in fluid communication with the reaction chamber to further reduce emissions.

13 Claims, 12 Drawing Sheets

(56) References Cited

U.S. PATENT DOCUMENTS

| | | | |
|---|---|---|---|
| 4,466,421 A | 8/1984 | Dorsch et al. | |
| 4,476,852 A | 10/1984 | Lee et al. | |
| 4,479,921 A | 10/1984 | Allaire et al. | |
| 4,550,668 A | 11/1985 | Piontkowski | |
| 4,553,527 A | 11/1985 | Albertson | |
| 4,582,044 A | 4/1986 | Ferguson et al. | |
| 4,584,177 A | 4/1986 | Fernbach et al. | |
| 4,635,568 A * | 1/1987 | Angelo, II | 110/214 |
| 4,844,051 A | 7/1989 | Horkey | |
| 4,862,869 A | 9/1989 | Hazard | |
| RE33,077 E | 10/1989 | Van Dewoestine | |
| 5,014,680 A | 5/1991 | Siemer | |
| 5,228,847 A | 7/1993 | Lywood et al. | |
| 5,295,448 A | 3/1994 | Vickery | |
| 5,460,511 A * | 10/1995 | Grahn | 110/210 |
| 5,499,622 A * | 3/1996 | Woods | 110/211 |
| 5,520,123 A * | 5/1996 | Chappell et al. | 110/188 |
| 5,934,268 A | 8/1999 | Onocki | |
| 5,944,025 A | 8/1999 | Cook et al. | |
| 5,975,890 A | 11/1999 | Kawasaki et al. | |
| 6,026,639 A | 2/2000 | Kumar | |
| 6,227,194 B1 | 5/2001 | Barudi et al. | |
| 6,237,587 B1 | 5/2001 | Sparling et al. | |
| 6,425,390 B2 | 7/2002 | Campbell et al. | |
| 6,488,024 B2 | 12/2002 | Champion | |
| 6,968,838 B1 * | 11/2005 | Tiegs | 126/500 |
| 7,275,929 B2 * | 10/2007 | Tiegs | 431/125 |
| 7,490,601 B2 | 2/2009 | Tiegs | |
| 2002/0064739 A1 | 5/2002 | Boneberg et al. | |
| 2005/0271990 A1 | 12/2005 | Lifshits | |
| 2007/0137537 A1 | 6/2007 | Drisdelle et al. | |
| 2008/0069749 A1 | 3/2008 | Liu et al. | |

\* cited by examiner

APPARATUS AND METHODS FOR REDUCING WOOD BURNING APPARATUS EMISSIONS

CROSS-REFERENCE TO RELATED APPLICATION

This application claims priority to U.S. Provisional Patent Application Ser. No. 61/140,830 filed Dec. 24, 2008, which is incorporated herein by reference.

FIELD OF THE INVENTION

The present invention relates to apparatus and methods to reduce emissions in exhaust streams of wood burning apparatus.

BACKGROUND

The process of burning batch-loaded wood in ambient air at atmospheric conditions begins with the application of sufficient heat (greater than approximately 350° F. (177° C.)) to initiate a self-sustaining combustion process. Heating first causes moisture contained in the fuel to evaporate into the space in the immediate vicinity of where the fuel heating is taking place with subsequent dispersion into the atmosphere. As fuel moisture is depleted in the area of the fuel being heated, the organic components of the fuel, consisting of but not limited to such compounds as lignin, hemicellulose, and cellulose, begin to break down by way of a thermal process called pyrolysis. Pyrolysis includes both oxidation and reduction reactions initiated by the increasing temperature of the fuel. Virtually all of the formed and reformed chemical species produced by the pyrolysis process are organic species ranging from simple methane and formaldehyde to complex molecules such as benzo-a-pyrene and some notorious toxins like dioxins.

At the temperatures at which wood pyrolysis reactions take place (i.e., generally above 300° F. (149° C.)) virtually all of the pyrolysis reaction products leave a burning piece of wood in a gaseous phase. This means that, at atmospheric conditions, the pyrolysis products will migrate or disperse out of and away from the wood fuel being heated. As these gases, all of which are combustible, leave the surface of the fuel they mix with air and it's 20.9% oxygen content. At the mixing point where there are combustible gases within the range of flammability concentrations and there is adequate temperature, generally above 600° F. (316° C.), the pyrolysis product and air mixture will generate a self-sustaining combustion process usually observed as flaming.

If the pyrolysis-product gases are too rich, become too diluted by air, or there is inadequate temperature to initiate a self-sustaining combustion process the pyrolysis-product gases will not "burn" and they will leave the combustion zone either as gaseous pollutants (primarily carbon monoxide and methane) or as suspended condensate droplets or aerosols, and particulates, which make up what is generally referred to as smoke or solid particulate emissions. These incompletely combusted liquids and particles deposit on chimney walls forming creosote, which creates chimney fire hazards and clogs chimney flow paths, and, as they exit the chimney, are released as pollutants. Such pollutants can cause significant local air pollution concerns. Indeed, some local building codes prohibit new wood burning fireplaces and wood stoves due to the smoke/particulate pollution.

If excessive dilution takes place in the combustion zone, the concentration of those pyrolysis-product compounds that typically produce visible smoke in flue gases can be reduced to levels below their condensation vapor pressures. When this occurs, little or no smoke is observed in the flue gases, but the total mass of emitted incompletely burned materials remains in the flue gases.

Since the elemental makeup of wood consists primarily of carbon, hydrogen, and oxygen, the complete combustion products of wood and its pyrolysis products results primarily in carbon dioxide and water. Small amounts of nitrogen and sulfur are present in wood at tenth of a percent levels which form nitrous oxides and sulfur oxides respectively when wood is burned. Other inorganic constituents of wood include the salts of calcium, sodium, potassium, magnesium, iron, silicon, chlorine, and phosphorus, which comprise virtually the total make up of the ash materials left after complete wood combustion has taken place.

To accomplish the compete combustion of wood it would first be necessary to heat the fuel evenly throughout and then as the various species of gaseous pyrolysis products are produced they would be evenly mixed with the appropriate amounts of air for ideal combustion and then evenly heated further to the appropriate temperature for initiating combustion (i.e., ignition temperature). This complete or ideal combustion process requires an ideal set of conditions that do not occur under the natural conditions found in fireplace combustion chambers. Under normal and typical fireplace conditions pieces of wood are heated unevenly with some areas reaching temperatures adequate to initiate pyrolysis but not hot enough or uniform enough to generate enough combustible gas to initiate combustion. Because fuel heating in a fireplace is so uneven throughout the burning of a fuel load, there will always be zones, like near where flaming is occurring, where temperatures are hot enough to cause the production of pyrolysis products but not hot enough to cause them to burn or they become too dilute by mixing with air to burn. In either case, these products of incomplete combustion (PICs) escape the combustion zone and, if there are no further steps taken to combust these materials, they become pollutants discharged to the atmosphere or accumulate on chimney surfaces. The same or similar processes hold true for combustion of other woody vegetation and parts thereof, e.g. biomass and agricultural waste such as nut shells and the stalks and husks remaining after grain threshing. In the context of this Application, therefore, reference to "fireplaces", "wood stoves" and other "wood burning apparatuses" includes apparatuses that burn wood, woody plants, biomass and agricultural waste.

Thus, there is a need for method and apparatus to reduce or eliminate PICs and other organic pollutants from wood burning apparatuses. Presently known art attempts to address this problem, but has not completely solved the problem. The following represents a list of known related art:

| Reference: | Issued to: | Date of Issue: |
| --- | --- | --- |
| U.S. Pat. No. 6,237,587 | Sparling et al | May 29, 2001 |
| U.S. Pat. No. 5,499,622 | Woods | Mar. 19, 1996 |
| U.S. Pat. No. 6,227,194 | Barudi et al | May 8, 2001 |
| U.S. Pat. No. 4,249,509 | Syme | Feb. 10, 1981 |
| U.S. Pat. No. 3,496,890 | La Rue | Feb. 24, 1970 |
| U.S. Pat. No. 4,422,437 | Hirschey | Dec. 27, 1983 |
| U.S. Pat. No. 4,476,852 | Lee et al | Oct. 16, 1984 |
| U.S. Pat. No. 5,944,025 | Cook et al | Aug. 31, 1999 |
| U.S. Pat. No. 4,385,032 | Fratzer et al | May 24, 1983 |
| U.S. Pat. No. 3,468,634 | Pauletta | Sep. 23, 1969 |
| U.S. Pat. No. 5,460,511 | Grahn | Oct. 24, 1995 |

The teachings of each of the above-listed citations (which does not itself incorporate essential material by reference)

are herein incorporated by reference. None of the above inventions and patents, taken either singularly or in combination, is seen to describe the instant invention as claimed.

U.S. Pat. No. 5,499,622 to Woods teaches a simple heating element and flue/draft enhancer to combust some PICs in a fireplace flue. Woods teaches temperatures only in the range 1100° F. up to 1500° F. (593° C. up to 816° C.), and specifically includes provisions to shut down the process if temperatures exceed 1500° F. (815° C.). Woods does not teach the use of catalysts as a secondary oxidizer. Woods requires the use of a tortuous pathway to remove particulates prior to reaching the heating elements. From 50% to 90% of the liquid condensation particles from wood combustion processes are less than 1.0 μm in diameter. Particles of this size do not "settle" out of air and are even difficult to separate from air using high velocity centrifugal forces. This fact alone renders Woods' "tortuous pathway" ineffective.

U.S. Pat. No. 4,476,852 to Lee, et al, teaches a simple catalytic insert into a fireplace flue. The catalyst element design of Lee would rapidly foul in the exhaust flue of a wood burning apparatus such as a fireplace or wood stove as it has no heating element to raise temperatures above 1500° F. (816° C.), which is needed to initiate catalytic action on the surfaces to completely oxidize PICs that may otherwise accumulate on the surfaces.

U.S. Pat. No. 3,468,634 to Pauletta teaches an incinerator for burning off unspecified "obnoxious fumes" exhausting from industrial processes. The only treatment process contemplated is heating the fumes to 800° F. to 1500° F. (427° C. to 816° C.). The afterburner includes a counter-flow heat exchanger which pre-heats incoming exhaust gases and an unspecified catalyst. The afterburner is positioned in the inlet plenum of the device, as is the catalyst. Pauletta does not address PICs, and does not contemplate using temperatures below 800° F. (427° C.) or above 1500° F. (816° C.). The heat exchanger design of Pauletta would rapidly foul if utilized in the exhaust flue of a wood burning apparatus such as a fireplace or wood stove.

U.S. Pat. No. 5,460,511 to Grahn teaches an afterburner for oxidizing the byproducts of incomplete combustion from internal combustion engines and wood stoves. The exhaust gases pass through a counterflow heat exchanger before entering the "firebox", which is located in the outlet plenum of the heat exchanger. Grahn contemplates the use of a catalyst-coated steel screen inside the firebox in order to reduce the required temperature for oxidizing the exhaust gases. The heat exchanger design of Grahn would rapidly foul if utilized in the exhaust flue of a wood burning apparatus such as a fireplace or wood stove. Grahn does not contemplate using temperatures above 600° F. to 800° F. (316° C. to 427° C.), and as described never exceeded 580° F. (304° C.). Moreover, Grahn relies on a self-sustaining reaction within the afterburner to function. Grahn's heating element and the heat generated by catalysis are used to initiate self-sustaining re-combustion, with the addition of an external air source, but the heating elements do not maintain temperatures above 1500° F. (816° C.) in order to completely oxidize PICs and prevent buildup on the surfaces of the system.

U.S. Pat. No. 4,385,032 to Fratzer, et al, teaches a catalytic waste gas converter for internal combustion engines using catalyst coated steel screens of various geometries to maximize surface area contact with the gas streams. Fratzer does not contemplate the use of an afterburner heat source, nor does Fratzer contemplate temperatures of greater than 1500° F. (816° C.). Nor does Fratzer contemplate use in a sooty exhaust stream, and in fact Fratzer would rapidly foul and become unusable if installed in the exhaust flue of a chimney or wood burning stove. Fratzer actually relies on a mechanical filter to remove particulate carbon waste (i.e. soot) before it reaches the catalytic gas converter so as to not clog the converter.

U.S. Pat. No. 5,944,025 to Cook et al., teaches a design for a reduced-smoke cigarette. Hot gases from a combustion chamber are passed through a catalyst coated ceramic mullite honeycomb before passing through a section containing cut tobacco and delivered to the smoker. The catalytic section reduces carbon monoxide from the combustion gases. The only fuels taught for the combustion chamber are clean burning liquid or semi-solids, which produce essentially no particulates. Cook does not teach methods for reducing PICs from wood burning systems, does not teach methods of reducing soot, and requires forced air flow (produced by the smoker inhaling) to treat gases. Cook does not teach the use of a separate heat source to completely oxidize PICs.

As seen by these references, the existing art relies on either heating exhaust streams to approximately 900° F. (480° C.) up to approximately 1472° F. (800° C.), or provision of a catalytic surface, or both, to reduce undesired emissions. The inventor has found this to be at best only a partial solution. With temperatures limited to below 1500° F. (816° C.) the PICs exhausted from a wood burning apparatus will not be completely oxidized, unless an oxidizer agent is added to the exhaust stream prior to heat treatment. Carbon particulates, in the form of soot, will not be completely oxidized, such that particulate emissions will still be problematic and internal surfaces in the flue and treatment apparatus will become fouled. The addition of catalysts into the exhaust stream aids in reducing undesired gaseous emissions, especially carbon monoxide and volatile HCs, but do not solve the problem of particulate emissions and will lose effectiveness over time as particulates become deposited on the catalyst bed surfaces.

Wood burning apparatus for home use vary considerably in size and design and performance, but typically home fireplaces produce approximately 50 to 150 cfm of exhaust flow during operation, while home wood stoves typically produce approximately 20 cfm of exhaust flow. The exhaust stream temperatures at the outlet of the firebox, where the woody material is burned, range from 300° F. to 600° F. (150° C. to 316° C.) for home fireplaces and wood stoves. Commercial wood burning apparatuses, such as boiler systems using agricultural waste or lumber mill waste, tend to have higher, steadier exhaust flow rates with more uniform smoke densities.

Wood stove exhaust streams tend to have lower flowrates and higher discharge temperatures, with higher smoke density—meaning higher density of PICs, carbon particles, and combustion gasses—than fireplaces. Fireplace exhaust streams tend to be diluted significantly and variable. Variability is caused by differing fireplace and flue designs, differences in maintenance/cleaning, use of a variety of types of logs and variable moisture levels, weather conditions at the flue outlet, and other conditions. The higher smoke density of wood stove exhaust streams means that treatment systems using catalysts are often able to maintain temperatures on the surface of the catalyst bed at or above 800° F., but using a catalyst bed alone for a fireplace is generally not reliable for creating a self-sustaining reaction to maintain temperatures above 800° F. on the catalyst surface. However, even for wood stoves, while catalyst beds create high temperatures on their surfaces, where they react with organic pollutants, they are not able to heat the actual exhaust stream itself to high enough temperatures to eliminate PICs. Only the particles which come in direct contact with the catalyst surface are catalyzed or heated sufficiently to oxidize.

Using high temperatures (>1500° F.) to reduce PICs is reliable, but it may be desirable to reduce temperatures to reduce power requirements and/or to enable use of less expensive materials. Injecting strong oxidizer agents into the exhaust stream prior to heat treatment can significantly reduce the temperature required to remove PICs, while the heat treatment process itself causes decomposition of excess oxidizer agent.

None of the foregoing references teach apparatus and methods for directing wood burning apparatus exhaust streams into a reaction chamber having multiple reaction chamber channels with heating elements for raising exhaust stream temperatures greater than 800° F. (427° C.). None of the foregoing references teach apparatus or methods for injecting oxidizing agents into the exhaust stream from a wood burning apparatus prior to entering a heated reaction chamber. None of the foregoing references teach apparatus or methods for maintaining lower temperatures for treatment of exhaust streams when injecting oxidizing agents into the exhaust stream and higher temperatures when no injection is used.

SUMMARY AND ADVANTAGES

Referring to FIGS. 4-13, an emissions reduction system for a wood burning appliance having an exhaust flue, comprising: an inlet plenum connectable to said exhaust flue; an outlet plenum; and, a reaction chamber in fluid communication with said inlet plenum and said outlet plenum, said reaction chamber including a heating element. A system includes wherein said reaction chamber includes one or more substantially parallel reaction chamber channels in fluid communication with said inlet plenum and said outlet plenum, each of said one or more reaction chamber channels including a heating element. A system includes wherein said reaction chamber further comprises a ceramic bed in fluid communication with said one or more reaction chamber channels, said ceramic bed disposed between said one or more reaction chamber channels and said outlet plenum. A system includes wherein said ceramic bed includes a catalytically active surface. A system includes wherein said reaction chamber further includes one or more reaction channel flow-adjustment dampers, each of said one or more reaction channel dampers controlling flow through one or more reaction channels. A system includes an oxidizing agent injector. A system includes wherein said oxidizer injector comprises: an oxidizer agent source; and, an injector distributor in fluid communication with said oxidizer agent source and having one or more discharge nozzles disposed between said appliance and said reaction chamber. A system includes an oxidizer injector controller in control communication with at least said oxidizer injector. A system includes wherein said oxidizing agent consists of one or more oxidizing agents selected from the group consisting of ozone, hydrogen peroxide, water, and high purity oxygen gas. A system includes wherein said injector distributor includes an annular distribution header having a plurality of discharge nozzles. A system includes wherein said distribution header is substantially aligned to said reaction chamber channels. A system includes an exhaust stream temperature sensor located downstream of said reaction chamber; and, an emissions reduction system controller in control communication with at least said heating elements and said exhaust stream temperature sensor. A system includes a reaction chamber adjustable-flow bypass, said bypass adjustable at least to the fully open and the fully shut positions. A system includes wherein said bypass further comprises: a central duct extending through the center of said reaction chamber in parallel with said one or more reaction chamber channels, and a movable bypass duct flow-adjustment damper disposed across said central duct. A system includes wherein said bypass further comprises: an annular duct surrounding said reaction chamber in parallel with said one or more reaction chamber channels, and a movable bypass duct flow-adjustment damper disposed across said annular duct. A system includes an exhaust stream temperature sensor located downstream of said reaction chamber; an adjustable-flow reaction chamber bypass duct in fluid communication with said inlet plenum and said outlet plenum; a movable bypass duct flow-control damper; a bypass duct flow-control damper actuator operably connected to said bypass duct flow-control damper, said actuator adjustable through the range of damper-fully-open to damper-fully-closed; and, an emissions reduction system controller, said controller in control communication with at least said heating elements, said exhaust stream temperature sensor, and said damper actuator. A system includes an oxidizing agent injector, said oxidizing agent injector including an oxidizer agent source, an injector distributor in fluid communication with said oxidizer agent source and having one or more discharge nozzles disposed between said appliance and said reaction chamber; wherein, said emissions reduction system controller is in control communication with at least said heating elements, said downstream temperature sensor, said damper actuator, and said oxidizing agent injector. A system includes a user interface in control communication with said emissions reduction system controller.

A method for reducing products of incomplete combustion in a wood burning apparatus exhaust stream, comprising: providing an emissions reduction unit for treatment, said emissions reduction unit including an inlet plenum, an outlet plenum, and a reaction chamber in fluid communication with said inlet plenum and said outlet plenum, said reaction chamber including a heating element; directing at least a portion of said exhaust stream into said emissions reduction unit reaction chamber and heating said portion of said exhaust stream therein; monitoring the temperature of said portion of said exhaust stream at a point downstream of said reaction chamber; adjusting the power output of said one or more heating elements to maintain said portion of said exhaust stream within a selected temperature range immediately downstream of said reaction chamber; and, discharging the byproducts of said portion of said exhaust stream from said emissions reduction unit. A method includes wherein said reaction chamber comprises: one or more parallel reaction chamber channels in fluid communication with said inlet plenum and said outlet plenum, each of said one or more reaction chamber channels including a heating element. A method includes wherein said emissions reduction unit further includes an adjustable flow bypass; and, adjusting said bypass to select the proportion of said exhaust stream entering said reaction chamber. A method includes selectively injecting oxidizing agent into said portion of said exhaust stream at a location upstream of said reaction chamber. A method includes wherein said selected temperature range is approximately 600° F. to approximately 1500° F. A method of claim 23, wherein said selected temperature range is approximately 600° F. (316° C.) to approximately 1500° F. when oxidizing agent injection is selected, and said selected temperature range is approximately 1500° F. (816° C.) to a temperature equal to or less than the maximum safe temperature of the system components when oxidizing agent injection is not selected. A method includes said selected temperature range includes a first control range and a second control range, and said first control range is from a first control range lower limit to a first control range upper limit, and said second control range is from said first control range upper limit to a second control range upper limit; and, the step of selectively injecting oxidizing agent further comprises: when said downstream temperature is within said first control range, said oxidizing agent includes aqueous hydrogen peroxide; and, when said downstream temperature is within said second control range, said oxidizing agent includes water without added hydrogen peroxide. A method includes wherein said first control range lower limit is at least 600° F. A method includes wherein said first control range upper limit is at least 1000° F. A method includes wherein said second control range upper limit is approximately 1500° F. A method includes wherein: said second control range upper limit is not greater than 1500° F. A method includes wherein said selected temperature range is from approximately 1500° F. (816° C.) to a temperature equal to or less than the maximum safe temperature of the reaction chamber components. A method includes after directing at least a portion of said exhaust stream into an emissions reduction unit, passing at least said portion of said exhaust stream through a heat recovery system. A method includes pre-heating said reaction chamber to within said selected temperature range prior to initiating combustion in said appliance. A method includes after heating said portion of said exhaust stream in said reaction chamber and prior to discharging said byproducts, passing said portion of said exhaust stream through a ceramic bed. A method includes wherein said ceramic bed comprises a honeycomb or open-cell foam structure. A method includes wherein said ceramic bed includes a catalytically active surface for contacting said heated exhaust stream. A method includes wherein said ceramic bed ceramic material is selected from the group consisting of mullite and corderite.

The emissions reduction system of an embodiment of the present invention presents numerous advantages, including: (1) it allows more complete and thorough heating of exhaust streams in the exhaust tubes to temperatures above 800° F. (427° C.); (2) allows significantly increased heating surface area and heat distribution within the reaction chamber; (3) provides for more efficient heating of exhaust streams that may be sustained at higher temperatures; (4) provides more complete oxidation of PICs and other organic pollutants, even at lower temperatures; (5) substantially prevents accretion of heating elements on interior surfaces; (6) is effectively self-cleaning; (7) provides greater flexibility in the design, construction, and operation of the apparatus as it is easily scaled for different sized applications by adding or removing reaction chamber channels and heating elements, or changing the cross-section or length of the reaction chamber channels; (8) use of heated reaction chambers reduces and/or eliminates any need for forced air flow through wood burning apparatus intended to improve combustion; (9) aids ignition process by creating a draft even when the firebox of the wood burning appliance is cold; (10) use of a honeycombed ceramic bed downstream of the reaction chamber or treatment area evens out the exhaust gas flow along the cross section of the exhaust flue; (11) allows for installation of a heat recovery system downstream of the reaction chamber in order to recover the substantial heat input into the exhaust stream, for example to provide heat for any number of industrial uses or space heating; (12) the high efficiency of the reaction chambers and/or oxidizing agent substantially destroys organic pollutants to reduce the corrosiveness of the downstream exhaust stream compared to an untreated system; (13) the surfaces of the emissions reduction system do not become fouled by soot, creosote, and other PICs that reduce thermal efficiency and flow rates and that create flue fire hazards; (14) unlike catalyst based emissions reduction systems, the reaction chamber system does not require the exhaust from the wood burning apparatus fire box to be at a minimum temperature to initiate catalytic combustion; (15) the reaction chamber channels may be individually-dampered or gang-dampered to vary the reaction; (16) the bypass duct may allow unhampered exhaust gas flow when the emissions reduction unit is not in use for example to reduced costs and increase component life when near 100% reductions are not required; (17) the reaction chamber channels may channelize the exhaust streams, which improves the effectiveness of a downstream catalyst bed; and (18) the catalyst bed downstream of the reaction chamber assists in oxidizing much of the remaining carbon monoxide and volatized hydrocarbons, which even though reduced by up to 99% may still be a significant amount in total.

Additional advantages of the invention will be set forth in part in the description which follows, and in part will be obvious from the description, or may be learned by practice of the invention. The advantages of the invention may be realized and attained by means of the instrumentalities and combinations particularly pointed out in the appended claims. Further benefits and advantages of the embodiments of the invention will become apparent from consideration of the following detailed description given with reference to the accompanying drawings, which specify and show preferred embodiments of the present invention.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

REFERENCE NUMBERS USED IN DRAWINGS

Figure 1:
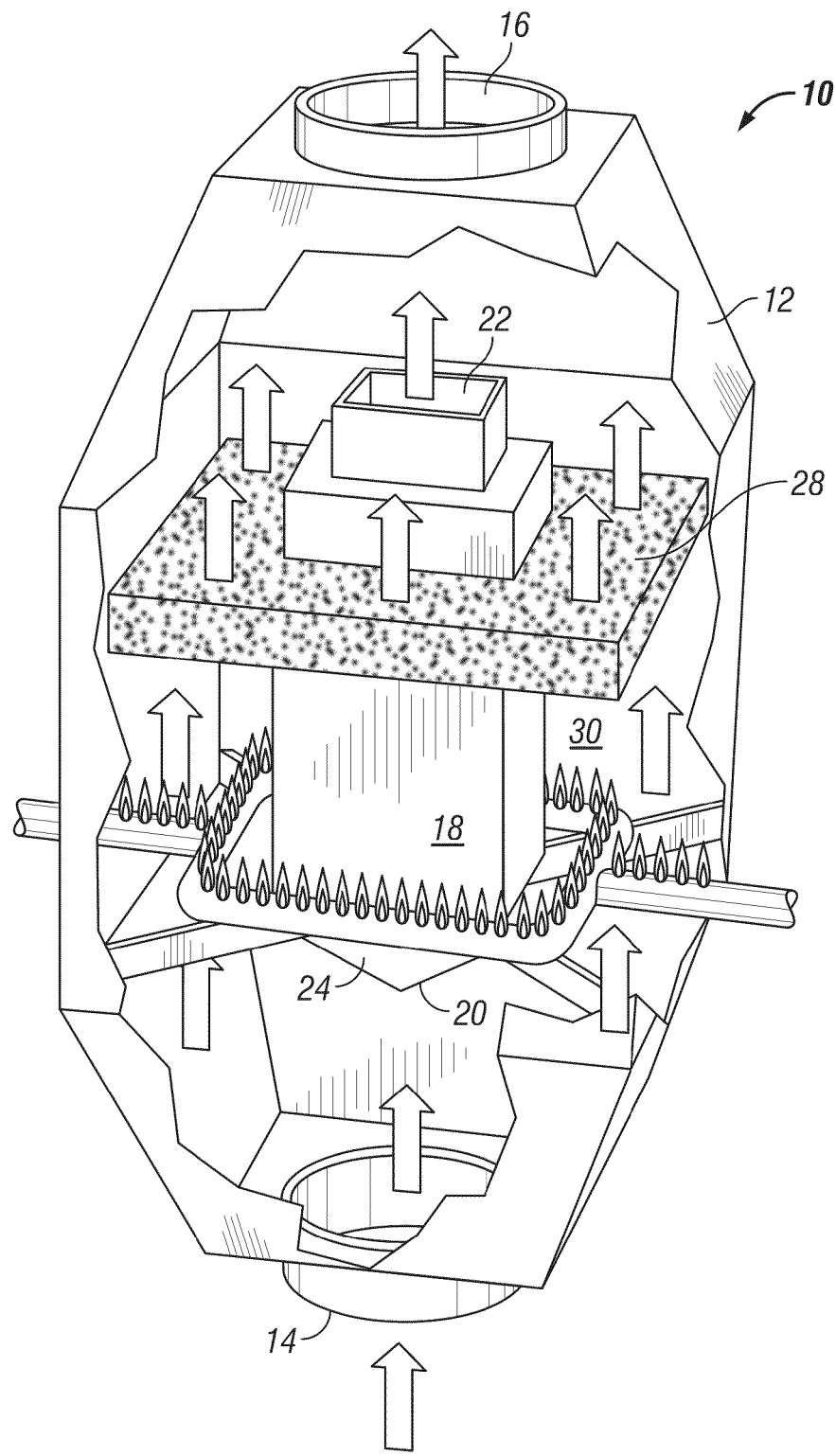
FIG. 1 shows a perspective cutaway view of an embodiment of the present invention.

The following reference numbers are used in the drawings.
- 10 Fireplace emissions reduction system with plenum afterburner
- 12 Shell
- 14 First open shell end
- 16 Second open shell end
- 18 Flue
- 20 First flue end
- 22 Second flue end
- 24 Doors
- 26 Heating element
- 28 Catalyst bed
- 30 Reaction chamber
- 108 Bypass duct damper actuator
- 110 Fireplace emissions reduction system with multiple reaction chamber channels
- 112 Shell
- 114 Inlet plenum
- 116 Outlet plenum
- 118 Reaction chamber bypass duct
- 120 Bypass duct inlet
- 122 Bypass duct outlet
- 124 Bypass duct adjustable dampers
- 126 Heating elements
- 130 Reaction chamber
- 132 Reaction chamber channels
- 134 Reaction chamber channel inlets
- 136 Reaction chamber channel outlets
- 140 Reaction chamber bottom plate
- 142 Reaction chamber top plate
- 144 Reaction chamber sidewall
- 146 Extension flange
- 208 Bypass duct damper actuator
- 210 Fireplace emissions reduction system with multiple reaction chamber channels
- 218 Reaction chamber bypass duct
- 220 Bypass duct inlet
- 222 Bypass duct outlet
- 224 Bypass duct adjustable dampers
- 226 Heating elements
- 230 Reaction chamber
- 232 Reaction chamber channels
- 234 Reaction chamber channel inlets
- 236 Reaction chamber channel outlets
- 240 Reaction chamber bottom plate
- 242 Reaction chamber top plate
- 244 Reaction chamber sidewall
- 308 Bypass duct damper actuator
- 310 Fireplace emissions reduction system with multiple reaction chamber channels and oxidizing agent injector
- 312 Shell
- 314 Inlet
- 320 Bypass duct inlet
- 322 Bypass duct outlet
- 326 Heating elements
- 328 Ceramic bed
- 330 Reaction chamber
- 332 Reaction chamber channels
- 334 Reaction chamber channel inlets
- 336 Reaction chamber channel outlets
- 340 Bottom plate
- 342 Top plate
- 344 Oxidizing agent injector penetration
- 350 Oxidizing agent injector
- 352 Oxidizing agent source
- 354 Injector piping
- 356 Injector distributor
- 358 Injector nozzles
- 360 Injector controller
- 362 System controller
- 364 User interface
- 366 Downstream temperature sensor
- 368 Oxidizer source
- 370 Oxidizer agent source leak sensor
- 372 Oxidizer agent control valve
- 374 Exhaust stream pollution monitor
- 376 Downstream pollution monitor
- 480 Heat recovery system
- 482 Hot coil
- 484 Cold coil outlet
- 486 Cold coil inlet
- 488 Heat sink
- 490 Cold coil
- 492 Heat sink blower
- 494 Outlet plenum
- S Wood burning apparatus
- F Exhaust flue

DETAILED DESCRIPTION

Before beginning a detailed description of the subject invention, mention of the following is in order. When appropriate, like reference materials and characters are used to designate identical, corresponding, or similar components in differing figure drawings. The figure drawings associated with this disclosure typically are not drawn with dimensional accuracy to scale, i.e., such drawings have been drafted with a focus on clarity of viewing and understanding rather than dimensional accuracy.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

The inventor has found that maintaining the temperature of the exhaust stream steadily over 800° F. (427° C.) provides nearly complete oxidation and elimination of PICs and particulates. Maintaining the flue exhaust stream itself, rather than just the surface of a heating element, at such high temperatures for an adequate time requires the mass of the exhaust stream to remain in proximity to a heating element surface at greater than 1500° F. (816° C.).

The inventor has found an effective method for heating exhaust stream gases to oxidize PICs and other pollutants is to provide a reaction chamber and/or an oxidizer injection system. The efficiency of a reaction chamber is improved by providing one or more parallel flow channels, where each tube includes a heating element. Parallel channels may be provided by tubes ganged together, or by machining or forming channels into a unitary structure, such as a metal or ceramic block. The exhaust stream flows through the individual channels, and the entire mass flow of each individual stream is thereby maintained in close proximity to the heating elements in the channels for a prolonged period. The hot interior wall surfaces of the tubes provide significantly increased heating surface area and distribution, as well, due to the close proximity of the tubing to the heating element and constant flow of heated exhaust within the channels. The individual streams are thereby efficiently heated and, importantly, sustained at temperatures greater than 1500° F. (816° C.)—or some lower temperature in combination with oxidizer agent injection—to ensure near-complete oxidation of PICs and other organic pollutants. A sustained high temperature also prevents accretion on the heating elements or the interior surfaces of the reaction chamber tubing so that the reaction chamber is effectively self-cleaning. If the exhaust stream of a wood burning apparatus is not raised to at least 1501° F. (817° C.), and preferably higher, then a significant proportion of the PICs in the exhaust stream will be released rather than oxidized and reduced to carbon dioxide and water. The inventor has found that heating exhaust streams to greater than 1500° F. (816° C.) for at least 0.1 seconds provides up to a 99 percent reduction in PICs, even without oxidizer agent injection.

In addition to improved efficiency, the use of multiple reaction chamber channels provides greater flexibility in the design, construction, and operation of the apparatus. The system is easily scaled for different sized applications by simply adding or removing reaction chamber channels and heating elements, or changing the diameter or length of the reaction chamber channels. Reaction chamber channels may be individually-dampered or gang-dampered, so that during conditions where one or some of the tubes and their corresponding heating elements are not required those may be dampered while the remaining tubes continue to operate. A bypass duct may easily be incorporated through the center of the reaction chamber with reaction chamber channels surrounding the bypass in an annular configuration, or the bypass duct may itself have an annular configuration surrounding the reaction chamber channels. The bypass duct allows unhampered exhaust flow when the emissions reduction unit is not in use. Alternatively, local building codes and air quality regulations may not require full emissions reductions, so that the system can operate with the bypass full or partly open.

Another advantage of using multi-channel reaction chambers is that the channels create a more linear-flow exhaust stream that improves the effectiveness of an optional downstream catalyst bed. The inclusion of a catalyst bed downstream of the reaction chamber channels assists in oxidizing much of the remaining carbon monoxide and volatized HCs, which even though reduced by up to 99% may still be a significant amount in total. The high temperature of exhaust stream gases exiting the reaction chamber channels improves the effectiveness of the catalyst bed. The combination of heating the actual exhaust streams, rather than simply components that the exhaust streams impinge upon, and a downstream catalyst bed (which in combination provide great improvements over existing systems) creates a near-100% elimination of carbon monoxide, volatized HC's and other PIC's from the exhaust stream. The ability to divert part of the exhaust stream allows reduced costs and longer component life when near 100% reductions are not required.

The inventor has found that an effective means to achieve near-100% oxidation of PICs and organic particulates without heating exhaust streams to over 800° F. (427° C.) is to inject a strong oxidizing agent into the exhaust stream prior to heating in the reaction chamber channels. Temperatures significantly greater than 1500° F. (816° C.) can produce excessive $NO_x$ emissions, so lower temperatures may be desirable. Many compounds are known which can be used to oxidize organic compounds, but most have other undesirable characteristics. Chloride- and fluoride-based oxidizers can produce undesirable waste products, and can be dangerous to handle, making them undesirable for home use. Oxidizers which are not completely consumed in reactions with organics may themselves become unwanted pollutants. Cost of the chemicals and familiarity of the public with safety requirements are also concerns. The inventor has found that heat labile oxidizing agents are preferred because any excess oxidizing agent will be destroyed by the high temperatures achieved inside the reaction chamber. Thus, many oxidizing agents will function with such a system, but certain agents are preferable.

Ozone ($O_3$) and hydrogen peroxide ($H_2O_2$) have been found to be especially effective oxidizing agents for this purpose overall. Both ozone and hydrogen peroxide are very effective in oxidizing organic molecules and have been used in water treatment systems as partial substitutes for chlorination for many years. Concentrated oxygen gas ($O_2$) is also very effective and may be used. In this context, "concentrated oxygen" means oxygen supplied at greater than atmospheric concentration (approximately 21.3%), and not simply compressed or forced-draft air. Concentrated oxygen has a disadvantage of requiring stringent safety controls near heat sources and high cost, but it is functional. Both ozone and hydrogen peroxide are gaseous at room temperature in pure form and so are easily injected into an exhaust stream. Alternatively, hydrogen peroxide is miscible in water so it may be injected as a concentrated aqueous solution through atomizer nozzles. Excess ozone which is not consumed in oxidation-reduction reactions with organic molecules prior to the heated reaction chamber channels will simply decompose in the heated reaction chamber to oxygen gas. Similarly, excess hydrogen peroxide will decompose in the heated reaction chamber into oxygen gas and water ($H_2O$). Both of these decomposition reactions are themselves exothermic and so will contribute to the heating process. Both the ozone and peroxide decompose at temperatures of more than about 316° C. (601° F.). The oxygen gas produced will either be consumed in reactions with PICs and other organic molecules or be emitted without harm to the environment.

The inventor has found that "food grade" hydrogen peroxide, at 35% concentration, is effective and is conveniently available without special licenses in most areas. Hydrogen peroxide at this concentration or lower does not require special permitting. Lower concentration hydrogen peroxide function for the purpose. However, below approximately 3% hydrogen peroxide concentration the negative cooling effect of the water (requiring more energy and time to heat the exhaust stream to the desired temperature) tends to outweigh the beneficial oxidizing effect of the hydrogen peroxide and heat transfer/mixing benefits of the steam generated (unless temperatures are maintained high enough to sustain water gas reactions—i.e. greater than approximately 600° F.—such that the water itself becomes an oxidizer). Concentrations above 35%, and up to 100%, provide very efficient and effective oxidization benefits.

Several mechanisms are involved in using hydrogen peroxide or ozone to reduce PICs. First is the oxidation reaction that occurs when a hydrogen peroxide or ozone molecule contacts and reacts with the organic molecules comprising PICs, which will directly decompose or transform the organic molecule and generate heat as a byproduct. The following stoichiometric equations, involving carbon monoxide (CO), is an example of this type of oxidation reaction:

$$CO+H_2O_2 \rightarrow CO_2+H_2O+heat$$

$$CO+O_3 \rightarrow CO_2+O_2+heat$$

Additionally, hydrogen peroxide and ozone are labile and so undergo decomposition in the heated exhaust stream and reaction chambers to produce oxygen available for oxidation, as shown in the decomposition reactions:

$$2H_2O_2+heat \rightarrow 2H_2O+O_2$$

$$2O_3+heat \rightarrow 3\ O_2$$

$$2CO+O_2 \rightarrow 2\ CO_2+heat$$

The inventor has found that injecting oxidizing agents such as ozone and hydrogen peroxide into plenum-mounted afterburner reaction chambers (as in FIGS. 1-3), which lack reaction chamber channels, will still significantly increase the effectiveness of those systems, although they will still not achieve the effectiveness and efficiency of the channeled design.

Aqueous hydrogen peroxide and/or ozone can be injected into the exhaust stream via one or more fogging nozzles or atomizer nozzles. The inventor has found that a simple pin-hole type nozzle is functional for smaller flue diameters and small exhaust stream flow rates, but greater efficiencies can be achieved using multiple fogging or atomizer nozzles to inject oxidizing agent evenly throughout the exhaust stream. The water injected into the exhaust stream does not reduce the effectiveness of the oxidizing agents and will pass out the exhaust as steam, but has some minor cooling effect on the exhaust stream near the injection zone.

The inventor has found that distilled water is effective for initiating water gas reactions with the carbon monoxide and organic compounds in the hot exhaust stream. At temperatures above approximately 752° F. (400° C.) water reacts with carbon monoxide and may other organic compounds to form intermediate combustible compounds called water gases. Once formed in the presence of molecular oxygen at temperatures above approximately 752° F. (400° C.), these combustible compounds become oxidized to carbon monoxide and water.

Counterintuitively, the water introduced by injecting aqueous oxidizer agents can actually improve heat transfer within the reaction chamber itself. Water droplets can trap soot particles, and these droplets can be more "sticky" when briefly contacting the surfaces of the reaction chamber heating elements, thereby increasing the contact dwell time of the particles and ensuring oxidation. Steam has a higher heat capacity than air and other exhaust gases, so it can be more effective in transferring heat from the heating elements through convection. Additionally, the injection of the oxidizer agent and steam from the injected water introduces more turbulence into the exhaust stream, which improves mixing and heating throughout the stream mass.

Water itself becomes an effective oxidizer at temperatures greater than 662° F., initiating what is referred to as a water gas reaction. The temperature of 662° F. is the temperature at which water reacts with methane ($CH_4$), producing $CO_2$ and water in an exothermic reaction:

$$2H_2O+CH_4 \rightarrow CO_2+3H_2+heat$$

Similar reactions occur between water and other organic compounds at various initiation temperatures, some significantly higher than 662° F. The H2 gas generated is not concentrated enough to be explosive in the context of a wood burning appliance, and is quickly consumed by reactions with atmospheric oxygen in the flue or upon discharge. To obtain thorough oxidation of PICs using water injection alone, it is preferable to maintain exhaust stream temperature above 662° F. while providing approximately 10% dry steam by volume. Additionally, temperature sensors are subject to various inaccuracies and the temperature at one location in the exhaust stream may not accurately represent the temperature throughout the exhaust stream at that point, so it is preferable to maintain measured exhaust stream temperatures at approximately 1000° F. when using water alone as an oxidizer agent to ensure reliably adequate emissions reduction. Using water in combination with hydrogen peroxide and/or ozone permits the use varied oxidizer agents or combinations thereof within different temperature ranges, such as using a first temperature range (a lower range) and a second temperature range (an upper range extending from the upper limit of the lower range to the maximum desirable system temperature). Thus, for example, during startup from cold conditions a system may utilize hydrogen peroxide or ozone injection until the system is heated up and able to sustain exhaust stream temperatures at or above water oxidation reaction temperatures (generally approximately 1000° F.), and similarly during shutdown, or if for some reason temperatures dipped below the designated control band. The upper limit of the lower temperature range may vary depending on expected conditions in the exhaust stream—for example, when different mixes of fuel are burned in the appliance. The use of at least two control bands with a break point at approximately 1000° F. is generally adequate for most consumer/home-installed wood burning appliances (such as fireplaces and wood stoves), but more control ranges could be used for optimized control. The upper limit of the upper temperature range may be limited by heating element capacity (e.g. maximum fuel flow or volt-amp limits) or by the materials used in the emissions control system and downstream in the flue itself. Higher temperatures require materials which can withstand such higher temperatures—and are therefore generally more expensive—so the maximum temperature limit may be defined as the maximum safe temperature of the system components. Such a reference temperature is most easily determined by the system designer, including any safety factors necessary.

The inventor has also found that the use of heated reaction chambers, and especially reaction chamber channels, eliminates any need for forced air flow through wood burning apparatuses intended to improve combustion. The hot gases exhausting upwards from the heated reaction chambers in a chimney or flue create a thermal draft which draws air in through the fire box. This aids in igniting the appliance by creating a draft even when the fire box is still cold and improves combustion efficiency by drawing more air through the fire box (thereby reducing emissions from the fire box itself). The Inventor has found that the draft created by the reaction chambers is so strong that dampering is usually required to reduce the amount of air drawn through the fire box.

The inventor has discovered that the use of reaction chambers and maintenance of exhaust stream temperatures over 800° F. (427° C.) also allows for simplified control methods which can conserve energy while insuring adequate emissions reduction. Efficiency can be assured by monitoring the temperature of the exhaust stream downstream of the reaction chambers and controlling heating element power input to maintain greater than 800° F. (427° C.) in the exhaust stream. A lower temperature set point may be selected when using a reaction chamber system in combination with oxidizer agent injection, to maintain exhaust stream temperatures at least 600° F. (327° C.) to ensure complete labile decomposition of any oxidizer agent which has not reacted with pollutants.

The use of a honeycombed ceramic bed downstream of the reaction chamber or treatment area serves several purposes. The ceramic bed evens out the exhaust gas flow along the cross section of the exhaust flue. Ceramic is preferred because ceramic is less vulnerable to corrosion than metal systems. The exhaust flue environment is extremely variable in temperature and moisture levels, because it is exposed to both the inside environment of the building and the external weather when not in use, and then to extremely high temperatures when in use. The chemical environment is also fairly extreme, as organic deposits accumulated before reaching operating temperatures can be very acidic and corrosive until destroyed by heat and/or oxidizers, and even stainless steel alloys may corrode under these conditions. Additionally, metallic components undergo greater thermal expansion and contraction than ceramics, which is more difficult to accommodate in structures arranged transversely within an exhaust flue. The use of catalytically active ceramics, or ceramics coated with catalytically active materials, is more important to operation during startup and shutdown, when reaction chamber temperatures are below the minimum set point and oxidizer agents are not being injected. At lower temperatures excess oxidizer might not completely decompose and can therefore become a pollutant itself, so generally oxidizing agent injection would not be initiated until the reaction chamber temperatures were up to at least 400° F. or greater, and preferably not until reaction chamber temperatures reached at least 600° F. When operating at temperatures of over 1500° F., any catalyst in the ceramic bed will have minimal effect on organic pollutants because virtually all organic pollutants are destroyed by heat in the reaction chambers and/or by oxidization from oxidizing agent prior to the reaction chambers. Catalysis is not required to maintain adequate temperatures in the treatment system, and when the reaction chambers are operating at high temperature catalysis contributes less than 1% to the heating of the exhaust.

An additional advantage is obtained by the reaction chamber system. A heat recovery system may be installed downstream of the reaction chamber in order to recover the substantial heat input into the exhaust stream. A heat recovery system includes a heat exchanger that can be disposed within the flue exhaust stream. Due to the high efficiency of the reaction chamber and/or oxidizing agent in destroying organic pollutants, the downstream exhaust stream is much less corrosive than in an untreated system. Additionally, the surfaces of the heat exchanger do not become fouled by soot, creosote, and other PICs that reduce thermal efficiency, and flow rates and which create flue fire hazards. The heat exchanger may therefore be made from less expensive materials and requires significantly reduced maintenance. A heat recovery system may provide heat for any number of industrial uses or space heating.

Unlike catalyst based emissions reduction systems, the reaction chamber system does not require the exhaust from the appliance fire box to be at a minimum temperature to initiate catalytic combustion. During startup and shutdown, the exhaust stream temperatures may be too low to support catalytic combustion, or the smoke density of the exhaust stream may be too low to sustain catalytic combustion. The reaction chamber of the present invention provides the necessary energy to destroy pollutants from an external source, and may be pre-heated so that emissions reduction efficiency will be near 100% even during startup and shutdown. Pure catalytic combustion systems cannot match this startup and shutdown efficiency. Even during normal operation, with a raging fire in the fire box, typical fireplaces (and non-high-efficiency wood stoves burning natural logs rather than pellets or compressed logs) produce exhaust streams that are both too dilute and at too low a temperature to sustain catalytic combustion. Therefore, a catalyst system, without more, would not be effective in reducing fireplace emissions significantly. The thermodynamic environments within the exhaust flues of wood burning apparatus such as fireplaces and wood stoves is very different from those of gas or oil fired systems, or internal combustion engines, having relatively stable and predictable characteristics at a given power level.

Figure 2:
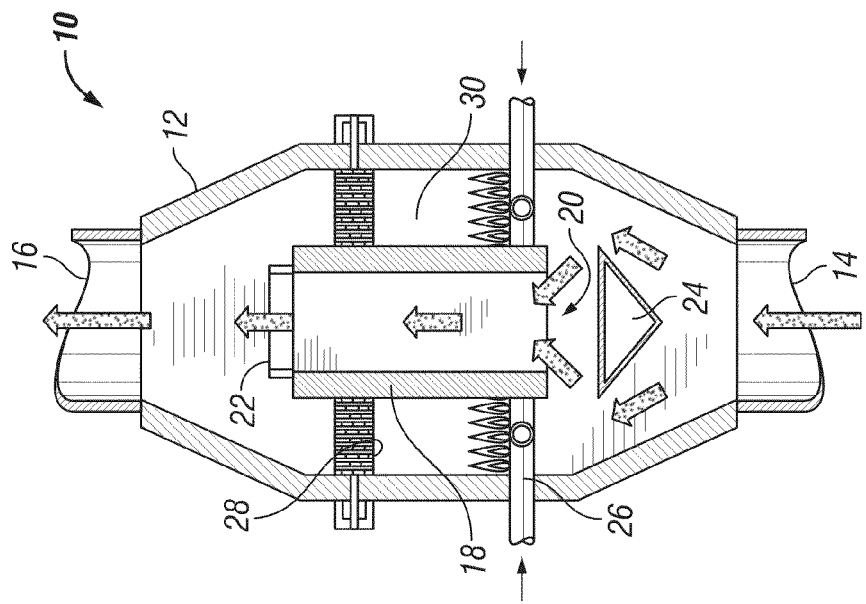
FIG. 2 shows a side cutaway view of an embodiment of the present invention
Figure 3:
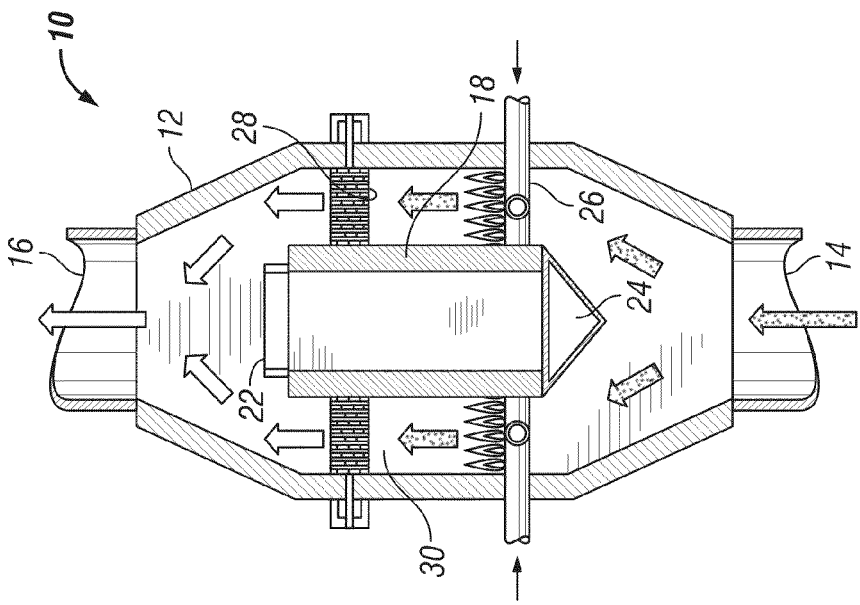
FIG. 3 shows another side cutaway view of an embodiment of the present invention.
Figure 4:
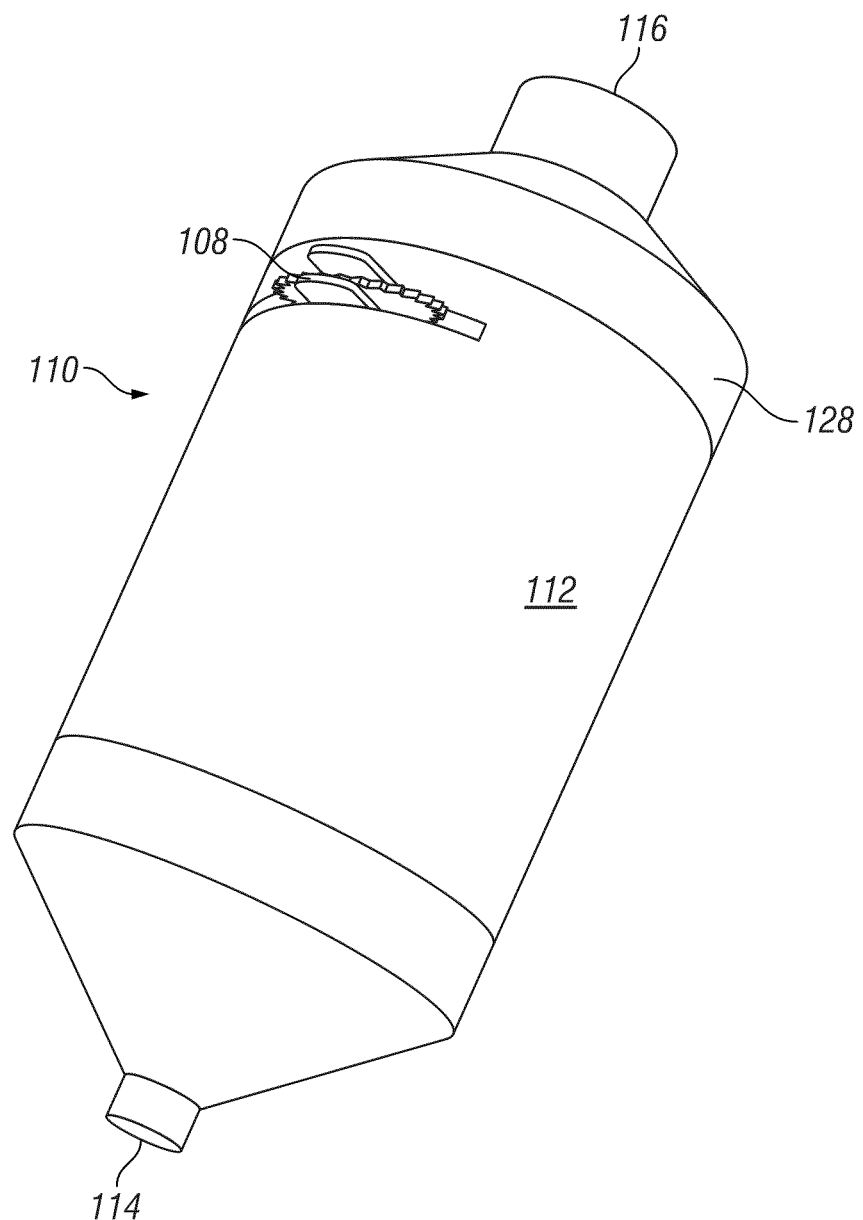
FIG. 4 shows a side view of an embodiment of the invention having multiple parallel reaction chamber channels.
Figure 5:
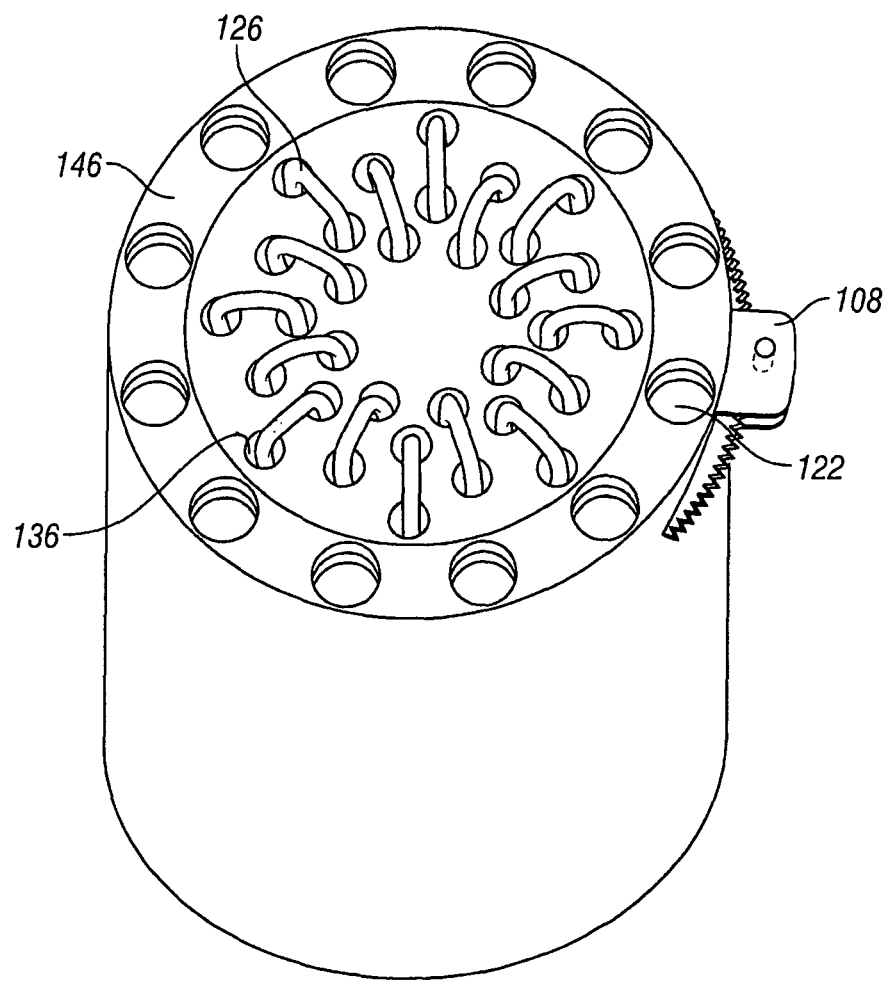
FIG. 5 shows a top perspective view of an embodiment of the invention having multiple parallel reaction chamber channels with an open annular bypass.
Figure 6:
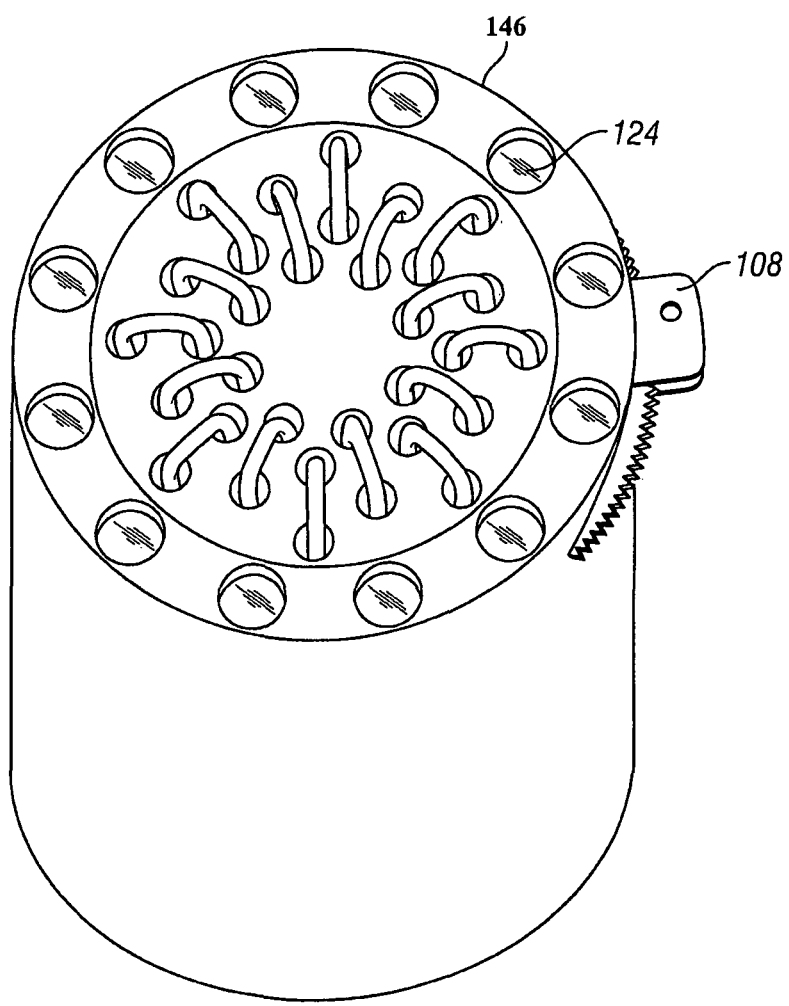
FIG. 6 shows a top perspective view of an embodiment of the invention having multiple parallel reaction chamber channels with a closed annular bypass.
Figure 7:
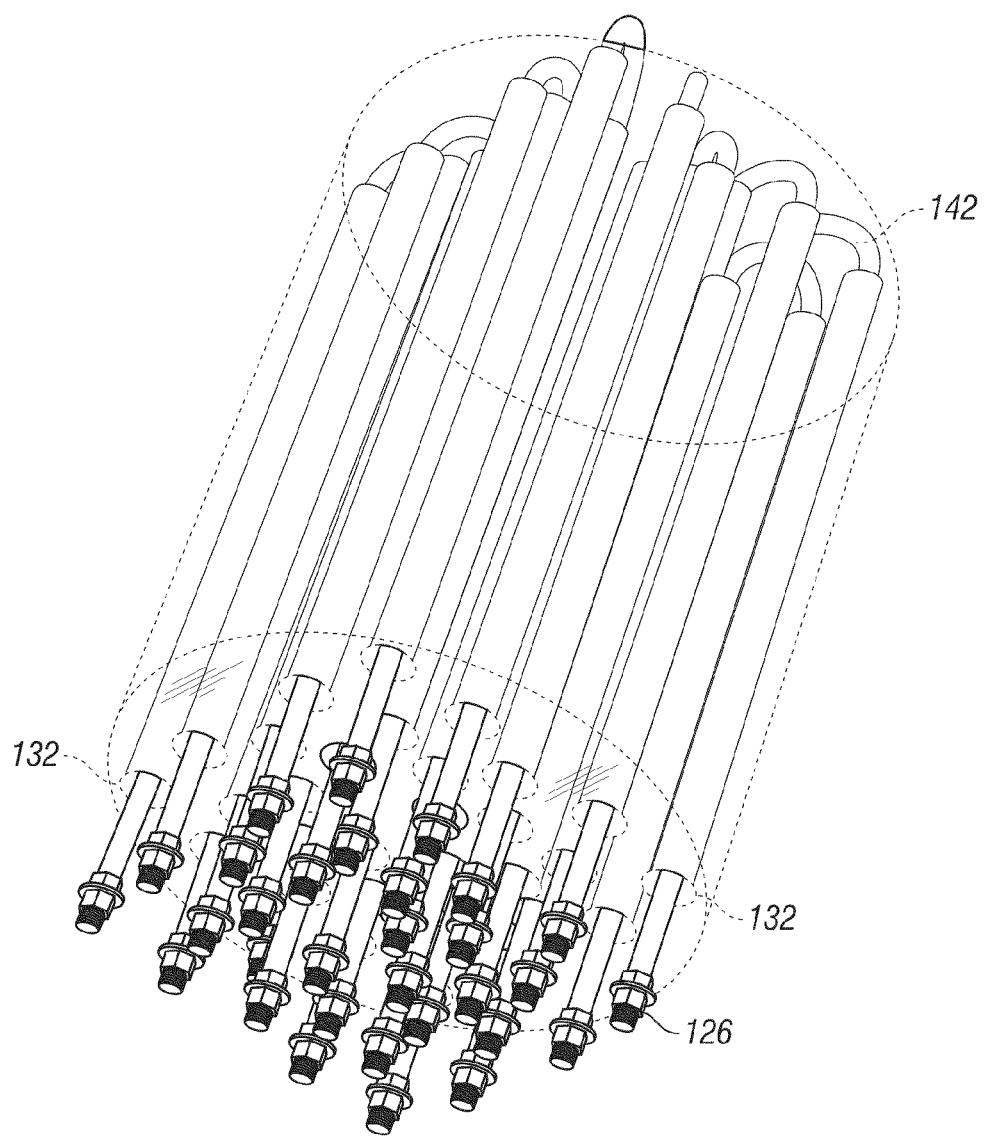
FIG. 7 shows a transparent bottom perspective view of the interior of an embodiment having multiple parallel reaction chamber channels.
Figure 8:
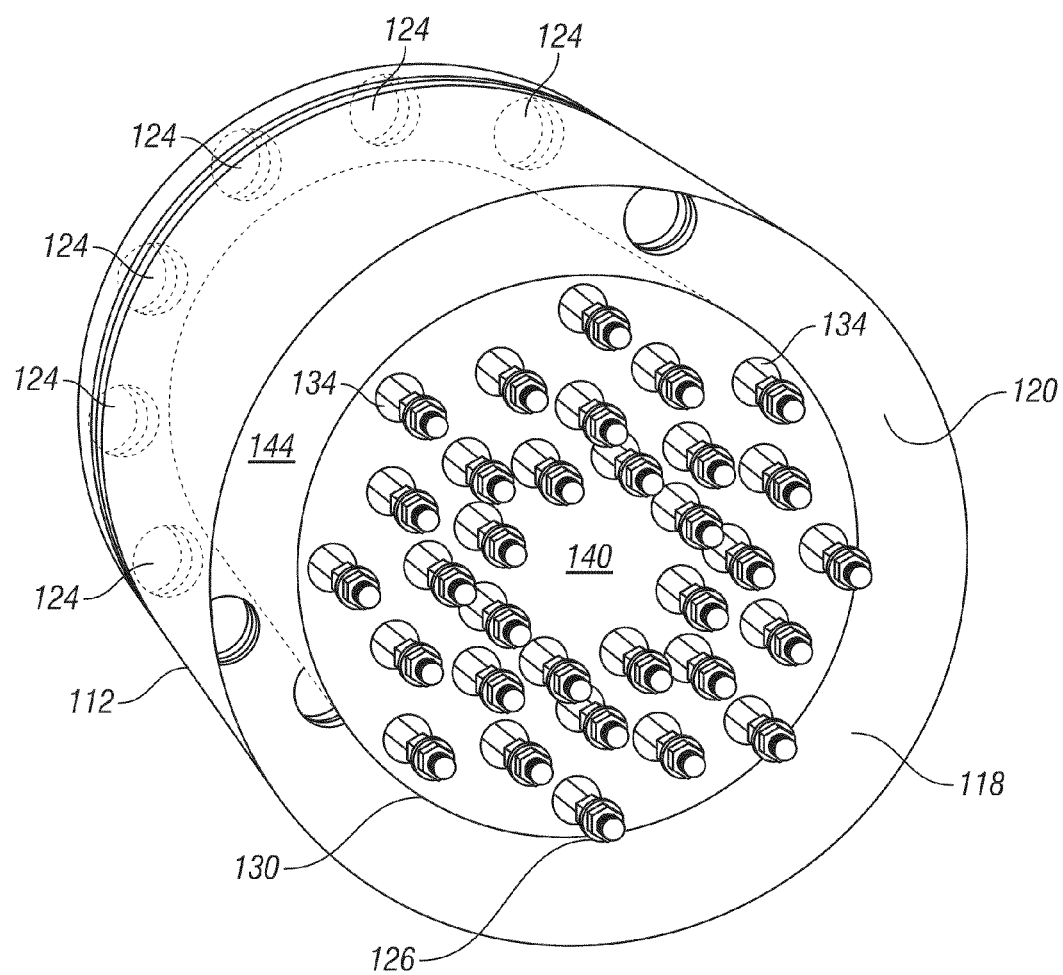
FIG. 8 shows a bottom perspective view an embodiment of the invention having multiple parallel reaction chamber channels with an open annular bypass.

As shown in FIGS. 1-3, a fireplace afterburner 10 is provided comprising a shell 12 having a first open shell end 14 for receiving fireplace emissions and a second open shell end 16 for expelling fireplace emissions, a bypass flue 18 inside shell 12 having a first flue end 20 which can be closed and a second flue end 22 which is open, wherein when, as shown in FIGS. 1 and 2, the first flue end 20 is closed fireplace emissions flow around bypass flue 18, and wherein when, as shown in FIG. 3 first flue end 20 is open fireplace emissions flow through bypass flue 18, heating element 26 connected to shell 12 and encircling bypass flue 18, wherein heating element 26 heats exhaust streams that pass in proximity to the element, and a catalyst bed 28 connected to shell 12 and encircling bypass flue 18.

The shell 12 is preferably made of sheet metal and is attachable to the exhaust flue of standard chimney exhausts. Those skilled in the art will know that there are numerous ways to connect the shell to a chimney exhaust flue. In the preferred embodiment, a portion of chimney exhaust flue equal in length to the shell is removed and the shell is inserted in its place, connecting to the exhaust flue at the first and second open shell ends, 14 and 16.

In an embodiment, bypass flue 18 inside the shell 12, connects to shell 12 with metal supports which can be bolted, welded, or use other similar connection method, to the shell 12 and bypass flue 18. Preferably, bypass flue 18 is a sheet metal cylinder. Bypass flue 18 has a first flue end 20 and a second flue end 22. First flue end 20 includes damper 24 which can be opened or closed. As shown in FIG. 2, when the first flue end 20 is closed fireplace emissions flow around said flue and by draft are forced to go by the heating element 26 and through the catalyst bed 28. As shown in FIG. 3, when the first flue end 20 is open fireplace emissions flow through said flue.

As shown in FIGS. 2 and 3, in an embodiment damper 24 is a stopper that slides downward, creating an entry to the flue 18 through which air can draft. Damper 24 can be attached to the inside of bypass flue 18 by sliders or coaster, which allow the damper 24 to slide up and down to close or open the flue 18 to draft. The invention is not limited by the ways in which a door or stopper can be attached and applied to the flue to selectively open or close the flue for draft.

Heating element 26 is mounted inside shell 12 and encircles bypass flue 18, thereby forming a reaction chamber 30. Heating element 26 heats emissions that pass in proximity to the element. Referring to FIGS. 1-3, in an embodiment heating element 26 is a natural gas burner of stainless steel tubing with burner holes and an automatic igniter. Heating element 26 is mounted inside shell 12 and bypass flue 18 with metal supports. Those skilled in the art will know that gas burners for heating element can come in many shapes and designs. A gas supply to the heating element provides the fuel for the heating element 26. Those skilled in the art will know that heating element can also use other methods for example electrical heating elements.

Catalyst bed 28 connects to shell 12 and encircles said bypass flue 18. Catalyst bed 28 temperatures greater than 1501° F. (817° C.) should be maintained in order to complete the combustion. Catalyst substrate of the catalyst bed is a ceramic honeycomb, preferably mullite, which is commercially available in honeycomb construction. Catalyst substrates, metal or ceramic, withstanding temperatures of up to 2000° F. (1093° C.) and any shape (e.g., honeycomb or reticulated foam) suitable for allowing the amount of flue-gas flow are suitable for the purpose. Catalyst bed is preferably wash-coated with palladium and platinum oxides. Mullite is preferred due to its useful catalytic properties.

Referring to FIGS. 4-13, an emissions reduction system for a wood burning appliance having an exhaust flue, comprising: an inlet plenum connectable to said exhaust flue; an outlet plenum; and, a reaction chamber in fluid communication with said inlet plenum and said outlet plenum, said reaction chamber including a heating element. A system includes wherein said reaction chamber includes one or more substantially parallel reaction chamber channels in fluid communication with said inlet plenum and said outlet plenum, each of said one or more reaction chamber channels including a heating element. A system includes wherein said reaction chamber further comprises a ceramic bed in fluid communication with said one or more reaction chamber channels, said ceramic bed disposed between said one or more reaction chamber channels and said outlet plenum. A system includes wherein said ceramic bed includes a catalytically active surface. A system includes wherein said reaction chamber further includes one or more reaction channel flow-adjustment dampers, each of said one or more reaction channel dampers controlling flow through one or more reaction channels. A system includes an oxidizing agent injector. A system includes wherein said oxidizer injector comprises: an oxidizer agent source; and, an injector distributor in fluid communication with said oxidizer agent source and having one or more discharge nozzles disposed between said appliance and said reaction chamber. A system includes an oxidizer injector controller in control communication with at least said oxidizer injector. A system includes wherein said oxidizing agent consists of one or more oxidizing agents selected from the group consisting of ozone, hydrogen peroxide, water, and high purity oxygen gas. A system includes wherein said injector distributor includes an annular distribution header having a plurality of discharge nozzles. A system includes wherein said distribution header is substantially aligned to said reaction chamber channels. A system includes an exhaust stream temperature sensor located downstream of said reaction chamber; and, an emissions reduction system controller in control communication with at least said heating elements and said exhaust stream temperature sensor. A system includes a reaction chamber adjustable-flow bypass, said bypass adjustable at least to the fully open and the fully shut positions. A system includes wherein said bypass further comprises: a central duct extending through the center of said reaction chamber in parallel with said one or more reaction chamber channels, and a movable bypass duct flow-adjustment damper disposed across said central duct. A system includes wherein said bypass further comprises: an annular duct surrounding said reaction chamber in parallel with said one or more reaction chamber channels, and a movable bypass duct flow-adjustment damper disposed across said annular duct. A system includes an exhaust stream temperature sensor located downstream of said reaction chamber; an adjustable-flow reaction chamber bypass duct in fluid communication with said inlet plenum and said outlet plenum; a movable bypass duct flow-control damper; a bypass duct flow-control damper actuator operably connected to said bypass duct flow-control damper, said actuator adjustable through the range of damper-fully-open to damper-fully-closed; and, an emissions reduction system controller, said controller in control communication with at least said heating elements, said exhaust stream temperature sensor, and said damper actuator. A system includes an oxidizing agent injector, said oxidizing agent injector including an oxidizer agent source, an injector distributor in fluid communication with said oxidizer agent source and having one or more discharge nozzles disposed between said appliance and said reaction chamber; wherein, said emissions reduction system controller is in control communication with at least said heating elements, said downstream temperature sensor, said damper actuator, and said oxidizing agent injector. A system includes a user interface in control communication with said emissions reduction system controller.

Referring to FIG. 4-8, an embodiment of an emissions reduction system 110 is shown, including shell 112 having an inlet plenum 114 and outlet plenum 116, connectable to an exhaust flue, and reaction chamber 130 in fluid communication with inlet plenum 114 and outlet plenum 116 through reaction chamber channels 132. Preferably outlet plenum 116 has a greater cross-sectional opening than inlet plenum 114 to accommodate the much hotter exhaust flow without reducing flow rates.

Reaction chamber 130 includes multiple reaction chamber channels 132 which are parallel-flow, having inlet ends 134 open to inlet plenum 114 and outlet ends 136 open to outlet plenum 116. Each reaction chamber channel 132 has a heating element 126 extending through it, preferably extending substantially the entire length of reaction chamber channels 132. In the embodiment, heating elements 126 are ceramic coated electrical resistance elements of approximately 20 kW for each reaction chamber channel 132. Ceramic coatings are less liable to fouling and provide a more evenly heated surface. Some ceramic coatings, such as mullite, also possess desirable catalytic properties that assist in oxidizing organic molecules. Heating elements 126 are preferably ganged together in series circuits comprising multiple reaction chamber channel elements but may be individually or parallel wired as well. Alternatively, those of skill in the art will know that heating elements 126 may consist of gas burners or chemical heaters. Reaction chamber channels 132 are connected to reaction chamber bottom and top plates 140 and 142, respectively. In the embodiment, reaction chamber channels 132 are sealed at their connection points to bottom and top plates 140 and 142, and contained within enclosing sidewall 144, to ensure exhaust streams are directed only through tubes 132 or reaction chamber bypass 118, Preferably the space between tubes 132 and plates 140 and 142 may be filled with insulation material to improve efficiency of the system. Alternatively, reaction chamber channels 132 may be tubes individually wrapped with insulation, Reaction chamber top plate 142 is connected to shell 112 through flange extension 146. Preferably the cross-sectional areas of reaction chamber channels 132 are approximately twice that of heating elements 126, to provide adequate flow while maintaining exhaust streams in close proximity to the actual heating elements 126 for efficient and thorough heating. In the embodiment, heating elements 126 extend beyond reaction chamber channel inlets 134 into inlet plenum 114 and beyond reaction chamber channel outlets 136 into outlet plenum 116. Heating elements 126 may be incorporated into or within the sidewalk of reaction chamber channels 132, effectively creating an annular heating element.

Annular bypass duct 118 surrounds reaction chamber 130 and is in fluid communication with inlet plenum 114 at bypass inlet end 120 and with outlet plenum 116 at bypass outlet end 122. Annular bypass 118 includes adjustable flow-control damper 124 controllable through damper actuator 108. in the embodiment, bypass outlet end 122 includes a plurality of outlet holes penetrating through and disposed symmetrically around flange extension 146. In the described embodiment, adjustable damper 124 is a sliding plate and damper actuator 108 is a simple lever which rotates the sliding plate to adjust bypass flow. Damper actuator 108 may be a remote manual operator or a remotely controlled electro-mechanical, pneumatic, or hydraulic operator as well. Preferably the system is mounted vertically inside a chimney or in line with an exhaust flue—heating elements will enhance the natural draft by heating gases and causing them to exit vertically.

Emissions reduction system 110 may include a ceramic bed 128 downstream of reaction chamber 130. Preferably ceramic bed 128 is a ceramic honeycomb structure wash coated with a catalyst such as platinum oxide or palladium oxide, or a combination of the two. In an embodiment the catalyst bed is a mullite honeycomb substrate, which is itself a catalyst material, coated with platinum oxide.

Figure 9:
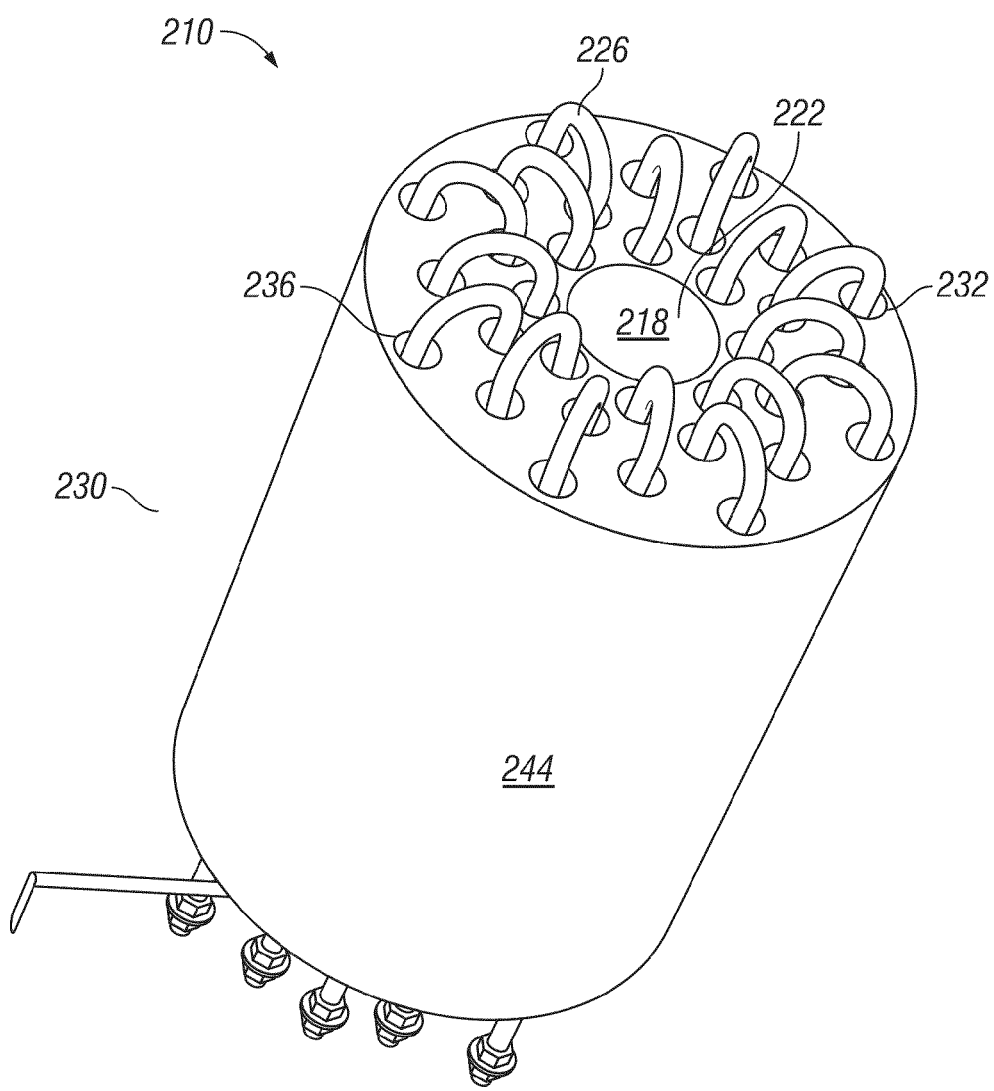
FIG. 9 shows a top perspective view of a reaction chamber having multiple parallel reaction chamber channels with a central bypass.
Figure 10:
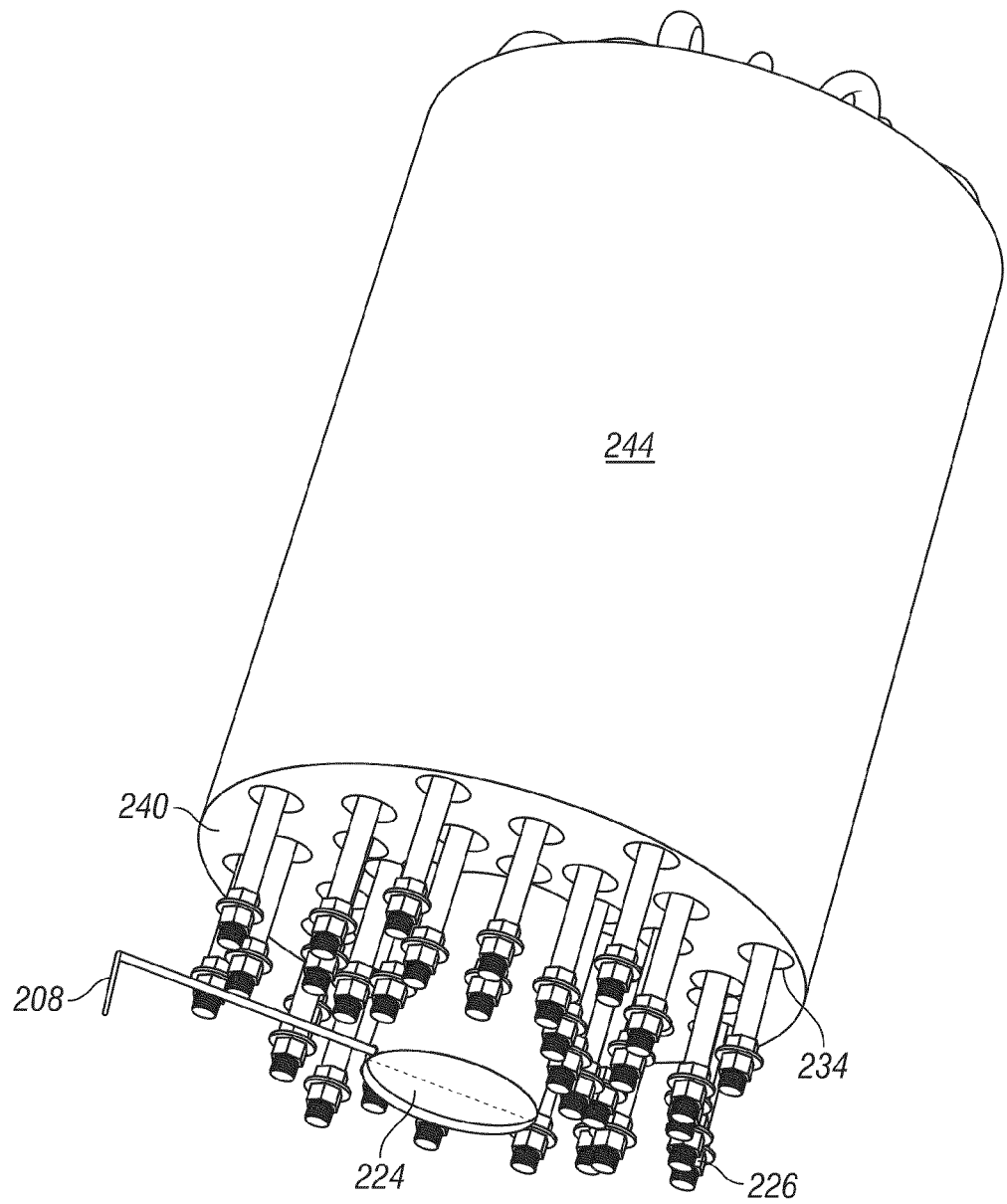
FIG. 10 shows a bottom perspective view of a reaction chamber having multiple parallel reaction chamber channels with a closed central bypass.

Referring to FIGS. 9-10, a reaction chamber 230 of another embodiment of a multichannel emissions reduction system is shown, substantially similar to that shown in FIGS. 4-8, but including a reaction chamber bypass duct 218 extending through the center of reaction chamber 230 parallel with reaction chamber channels 232. Reaction chamber 230 is defined by top and bottom plates 240 and 242, respectively, connected to sidewall 244, and reaction chamber channels 232. Multiple parallel-flow reaction chamber channels 232 are arranged in an annular configuration surrounding central bypass duct 218. Reaction chamber channels 232 have inlet ends 234 open to an inlet plenum 214 and outlet ends 236 open to an outlet plenum 216. Heating elements 226 are mounted inside each of reaction chamber channels 232 and extend substantially the entire length of reaction chamber channels 232. Adjustable bypass damper 224 is provided to control bypass flow. In the embodiment adjustable bypass flow-control damper 224 is a conventional flap or gate configuration. Preferably adjustable bypass flow-control damper 224 is located near the bypass duct inlet 220. Bypass damper actuator 208 is provided to control bypass damper 224. In the embodiment, bypass damper actuator 208 has a local manual operator, but could be a remote manual, electro-mechanical, pneumatic, or hydraulic operator as well.

Figure 11:
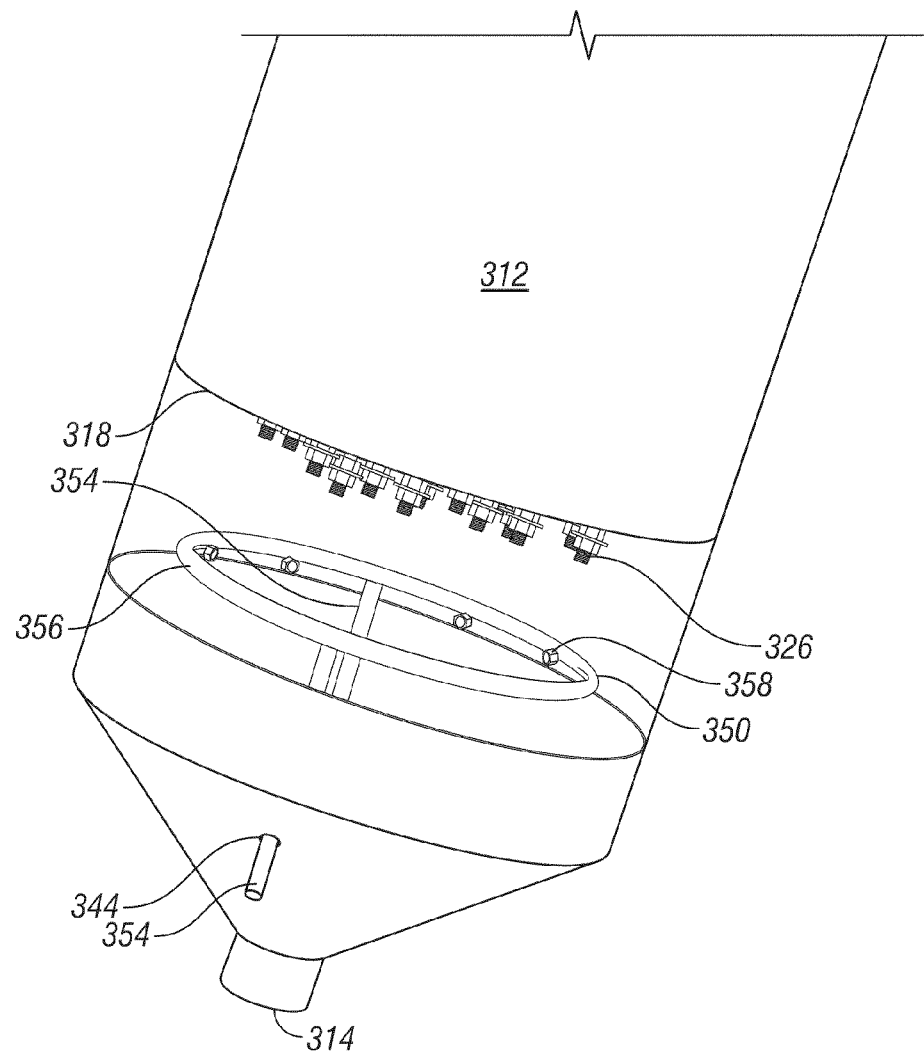
FIG. 11 shows a partial cut-away of a side view of an embodiment of the invention having multiple parallel reaction chamber channels with an annular bypass duct and oxidizing agent injector.
Figure 12:
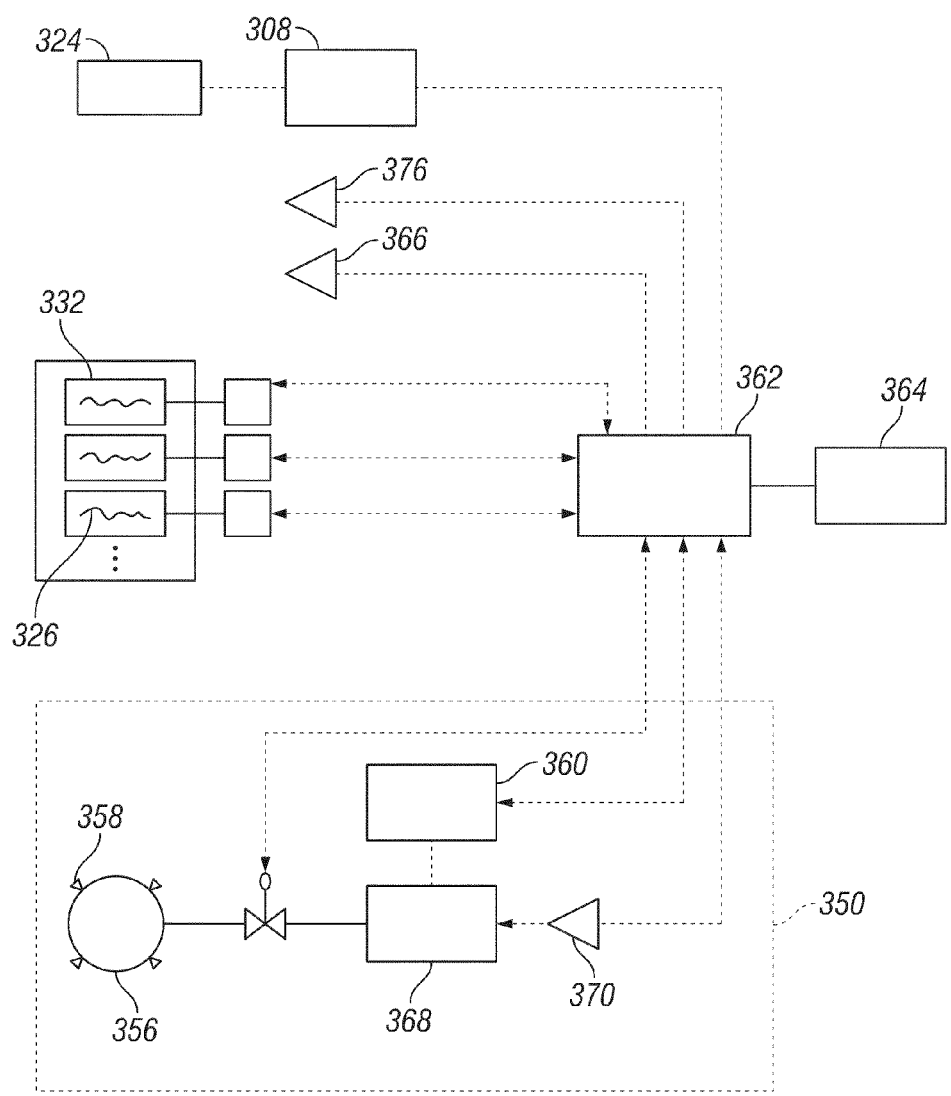
FIG. 12 shows a schematic diagram of a control system for an embodiment of the invention.

Referring to FIGS. 11-12, an embodiment of an emissions reduction system 310 is provided, including oxidizing agent injector 350. Emissions reduction system 310 is similar to the embodiment shown in FIGS. 4-8, having a shell 312, with inlet plenum 314 and outlet plenum 316 connectable to an exhaust flue F. Reaction chamber 330 includes multiple parallel-flow reaction chamber channels 332 having inlets open to inlet plenum 314 and outlets open to an outlet plenum with heating elements 326 mounted in each reaction chamber channel 332. Oxidizing agent injector 350 includes oxidizing agent source 352, injector distributor 356 mounted inside inlet plenum 314 with multiple injector nozzles 358 distributed symmetrically along injector distributor 356 and in fluid communication with oxidizing agent source 352. Nozzles 358 are disposed between the wood burning apparatus S and reaction chamber 330. In the embodiment, injector distributor 356 is provided in an annular configuration. Preferably injector nozzles 358 are substantially aligned with reaction chamber channels 332 so that oxidizing agent will flow into tubes 332 efficiently. In the embodiment injector distributor 356 and nozzles 358 are located entirely within inlet plenum 314, which has certain advantages for installation in tight spaces and reducing the number of penetrations 344. However, injector distributor 356 may be located externally from inlet plenum 314 and exhaust flue F with only nozzles 358 positioned inside, in order to minimize labile decomposition of oxidizing agent before discharge from nozzles 358 into the exhaust stream. Nozzles 358 may be positioned at any point between appliance S and reaction chamber 330, including within exhaust flue F upstream of inlet plenum 314.

In the embodiment inlet plenum 314 and outlet plenum 316 are shown as attached, generally conical, transition pieces, but the particular geometries will vary according to the layout of the exhaust flue F into which an emissions reduction system 310 is installed and the specific configuration of the particular emissions reduction system 310.

Injector distributor 356 is in fluid communication with oxidizing agent source 352 through supply piping 354. Supply piping 354 enters inlet plenum 314 through sealed penetration 344. Operation and control of injector 350 is provided by controller 360, which is in communication with oxidizing agent source 352 and other components, such as flow control valve 372, leak sensors 370, and other necessary sensors and equipment that would normally be incorporated in such a system.

In the embodiment, the oxidizing agent is hydrogen peroxide ($H_2O_2$) at 35% concentration. Source 352 may include a tank and appropriate valving and pressure source, for example a pump or gas overpressure system, for delivering oxidizing agent into supply piping 354 and injector distributor 356. Alternatively, an ozone gas generator may be used. Injector nozzles 358 are preferably atomizer nozzles distributed evenly along injector distributor 356. Alternatively, injector distributor 356 may include a single injector nozzle 358 capable of dispersing oxidizer agent into the exhaust stream.

Referring to FIG. 12, an embodiment of an automated emissions reduction system is shown. In the embodiment, system controller 362 includes a board-mounted electronic control system having any necessary microprocessors, memory, and input/output channels for monitoring and controlling other electrical and electronic devices. System controller 362 is in control communication with downstream temperature sensor 366 which detects the temperature of the exhaust stream downstream of reaction chamber 330, heating elements 326, oxidizing agent source 352 and/or oxidizer source 368 through oxidizing agent controller 360, and user interface 364. "Control communication" means transmitting and receiving using any suitable pathways and protocols, including for example, wire, fiber optics, or wireless, and including digital and/or analog transmissions. Those familiar with the art will understand that oxidizing agent controller 360 could either be incorporated into system controller 362 or could be a physically separate controller.

Oxidizing agent injector 352 includes a leak detector 370 for detecting leakage from oxidizer source 368, and a solenoid operated control valve 372 to turn oxidizer agent flow on or off. Downstream temperature sensor 366 is preferably mounted so as to impinge into the exhaust stream in order to measure gas stream temperature directly and not just wall temperature. However, temperature sensor 366 may be embedded within or outside the wall, with appropriate corrections for temperature lag and other inaccuracies designed into the system, such as by an offset programmed into the control system. Temperature sensor 366 could be a contact sensor such as an RTD or thermocouple, or non-contact such as an IR sensor or other type. Preferably temperature sensor 366 is installed immediately downstream of reaction chamber channels 232, or even within the channels themselves, in order to provide an accurate measurement of the exhaust stream temperature in the reaction chamber itself. In the embodiment, an exhaust stream pollution monitor 374 mounted downstream of reaction chamber 330 is provided to monitor performance of the system and/or detect oxidizing agent leakage, for example when the system is in a shut down condition and leakage occurs.

In the embodiment, system controller 362 controls reaction chamber bypass damper 324 through actuator 308, for example a motor or pneumatic cylinder. Preferably bypass damper 324 is proportionally controlled to allow adjustable flow control based on conditions and/or user inputs through user interface 364.

In the embodiment system controller 362 monitors the temperature from temperature sensor 366 and controls power to reaction chamber heating elements 326 to maintain exhaust stream temperature greater than 1500° F. (816° C.) when oxidizing agent injection is not in use. Placement of temperature sensor 366 downstream ensures that if the temperature at the downstream measurement point is greater than 1500° F. (816° C.), after travelling from the heat source in the reaction chamber, then the exhaust stream portion being treated has been above the setpoint temperature for at least 0.1 seconds. For example, for a fireplace with a round 1 ft (0.3 m) exhaust flue, and an exhaust flow rate of 150 cfm (0.027 m$^3$/min), placing temperature sensor 366 at least 7 inches (18 cm) downstream would guarantee at least a 0.1 second dwell time above the minimum temperature.

Plugs or other apparatus, such as dampers, may be provided to selectively block flow to one or more reaction chamber channels. This may be useful in situations where a heating element 326 has become inoperative, or where the exhaust flows and/or emissions standards do not require using the full mitigation capacity of the system so energy may be saved by using fewer heating elements 326. Blocking flow through a reaction chamber channel 332 prevents undesired bypass flow through unused tubes.

Figure 13:
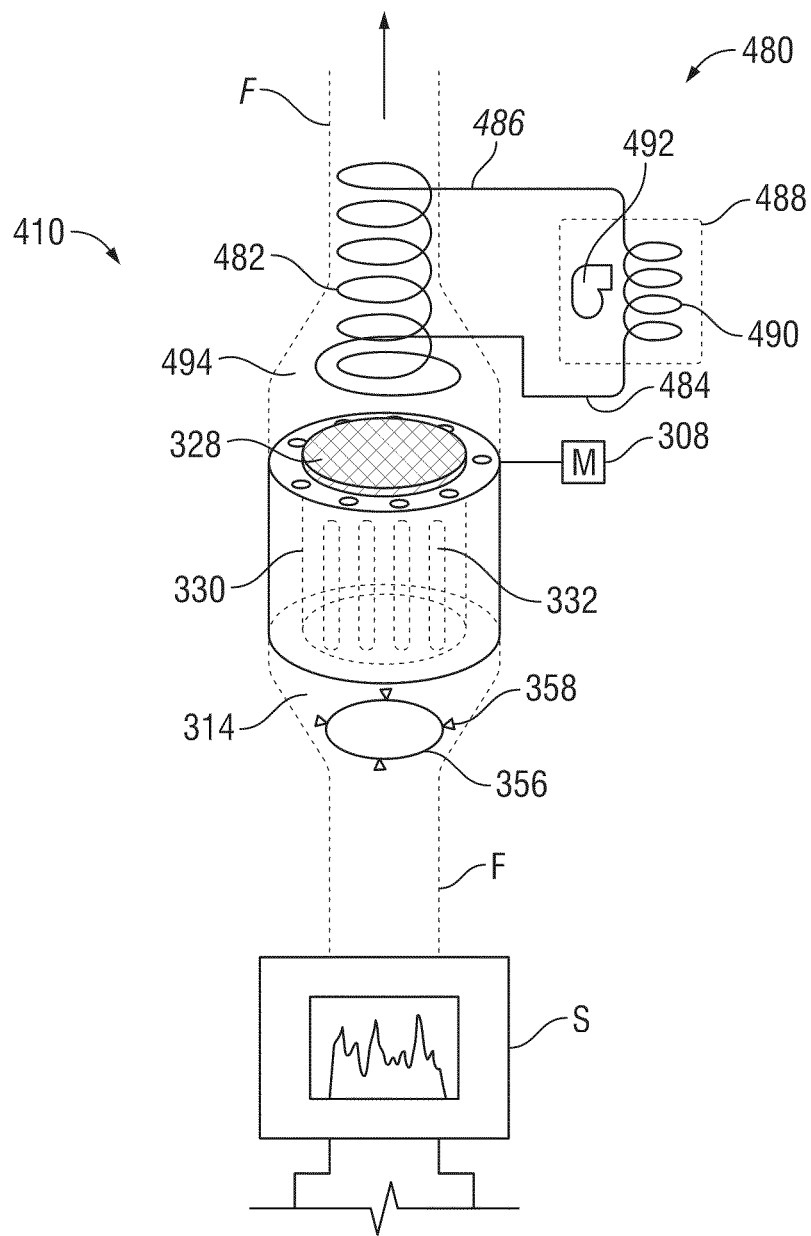
FIG. 13 shows an embodiment of the invention including a heat recovery system.

Referring to FIG. 13, an embodiment of an emissions reduction system 410 for a wood burning apparatus S, is shown which includes a heat recovery system 480 downstream of reaction chamber 432 and ceramic catalyst bed 328. In this embodiment, ceramic catalyst bed 328 is similar to previously described catalyst bed 28 in FIGS. 1-3, providing further oxidizing reaction surface and distributing heat evenly across the exhaust stream. In the embodiment heat recovery system 480 includes a gas-to-water heat exchanger including a hot coil 482 which is disposed partly within outlet plenum 494 and extends upward into exhaust flue F. In the embodiment hot coil 482 is configured annularly and spirals upwardly, with hot coil inlet (cold coil outlet) 484 at the bottom and hot coil outlet (cold coil inlet) 486 at the top, connecting to a heat sink 488. In the embodiment heat sink 488 includes a water-to-air heat exchanger coil 490 and air blower 492 blowing air over cold coil 490 to heat a space. Cold coil 490 and air blower 492 may be co-located with reaction chamber or may be remotely located to heat non-adjacent spaces. Preferably the cold coil inlet 486 is located above cold coil outlet 484 so as to take advantage of the thermal head to drive natural circulation and obviate the need for a pump. Alternatively, heat sink 488 could provide heat for any other needs, for example to a floor heating system, to a water heater, or to simply pre-heat air going into a furnace system. Larger heat loads or distantly located heat loads would likely require some sort of forced circulation to maintain flow through the system. Heat recovery system 480 could include a gas-to-air heat exchanger in addition to or as an alternative to hot coil 482. In situations where an emissions reduction system 410 having a heat recovery system 480 is installed in the exhaust flue of large wood burning apparatus, for example agricultural waste boiler systems, heat recovery system 480 may actually comprise several heat exchangers staged along exhaust flue F to provide heat to various loads and maximize heat recovery efficiency.

Again referring to FIG. 13, preferably hot coil 482 is located at least partially within outlet plenum 416 to place it in the hottest portion of the exhaust stream.

Referring to FIGS. 1-3, 4-8, 9-12, and FIG. 13, a method for reducing products of incomplete combustion in a wood burning apparatus exhaust stream, comprising: providing an emissions reduction unit for treatment, said emissions reduction unit including an inlet plenum, an outlet plenum, and a reaction chamber in fluid communication with said inlet plenum and said outlet plenum, said reaction chamber including a heating element; directing at least a portion of said exhaust stream into said emissions reduction unit reaction chamber and heating said portion of said exhaust stream therein; monitoring the temperature of said portion of said exhaust stream at a point downstream of said reaction chamber; adjusting the power output of said one or more heating elements to maintain said portion of said exhaust stream within a selected temperature range immediately downstream of said reaction chamber; and, discharging the byproducts of said portion of said exhaust stream from said emissions reduction unit. A method includes wherein said reaction chamber comprises: one or more parallel reaction chamber channels in fluid communication with said inlet plenum and said outlet plenum, each of said one or more reaction chamber channels including a heating element. A method includes wherein said emissions reduction unit further includes an adjustable flow bypass; and, adjusting said bypass to select the proportion of said exhaust stream entering said reaction chamber. A method includes selectively injecting oxidizing agent into said portion of said exhaust stream at a location upstream of said reaction chamber. A method includes wherein said selected temperature range is approximately 600° F. to approximately 1500° F. A method includes wherein said selected temperature range is approximately 600° F. (316° C.) to approximately 1500° F. when oxidizing agent injection is selected, and said selected temperature range is approximately 1500° F. (816°

C.) to a temperature equal to or less than the maximum safe temperature of the system components when oxidizing agent injection is not selected. A method includes said selected temperature range includes a first control range and a second control range, and said first control range is from a first control range lower limit to a first control range upper limit, and said second control range is from said first control range upper limit to a second control range upper limit; and, the step of selectively injecting oxidizing agent further comprises: when said downstream temperature is within said first control range, said oxidizing agent includes aqueous hydrogen peroxide; and, when said downstream temperature is within said second control range, said oxidizing agent includes water without added hydrogen peroxide. A method includes wherein said first control range lower limit is al least 600" F. A method includes wherein said first control range upper limit is at least 1000° F. A method includes wherein said second control range upper limit is approximately 1500° F. A method includes wherein: said second control range upper limit is not greater than 1500° F. A method includes wherein said selected temperature range is from approximately 1500° F. (816° C.) to a temperature equal to or less than the maximum safe temperature of the reaction chamber components. A method includes after directing at least a portion of said exhaust stream into an emissions reduction unit, passing at least said portion of said exhaust stream through a heat recovery system. A method includes pre-heating said reaction chamber to within said selected temperature range prior to initiating combustion in said appliance. A method includes after heating said portion of said exhaust stream in said reaction chamber and prior to discharging said byproducts, passing said portion of said exhaust stream through a ceramic bed. A method includes wherein said ceramic bed comprises a honeycomb or open-cell foam structure. A method includes wherein said ceramic bed includes a catalytically active surface for contacting said heated exhaust stream. A method includes wherein said ceramic bed ceramic material is selected from the group consisting of mullite and corderite.

Some or all of the exhaust stream from wood burning apparatus S having an exhaust flue F is directed into inlet plenum 314 of emissions reduction system 310, said system including inlet plenum 314, outlet plenum 316, connectable to an exhaust flue F, adjustable-flow annular bypass duct 318 which is sized to pass full exhaust stream flow when fully open, and which is in fluid communication with inlet plenum 314 and outlet plenum 316. Reaction chamber 330 includes parallel reaction chamber channels 332, each of which includes a heating element 326, and is in fluid communication with inlet plenum 314 and outlet plenum 316. Downstream temperature is monitored by temperature sensor 366 at a point far enough downstream to ensure the set point temperature of the treated exhaust stream has been maintained for at least 0.1 seconds. The power to heating elements 326 is adjusted based on the measured downstream temperature to maintain the treated portion of the exhaust stream at or above the set point temperature. The treated exhaust stream is then discharged through outlet plenum 316. Preferably, bypass duct 318 extends into outlet plenum 316 beyond reaction tubes 332, so that temperature sensor 366 is not affected by mixing of cooler untreated exhaust from the bypass with hot treated exhaust from reaction chamber 330.

Referring again to FIGS. 9-11, oxidizing agent injector 350 injects oxidizing agent into the portion of the exhaust stream to be treated prior to that portion entering reaction chamber 330. Oxidizing agent may be injected anywhere upstream of reaction chamber 330, including directly into exhaust flue F upstream of inlet plenum 314. Oxidizing agent injector 350 is controlled selectively to inject oxidizing agent into the exhaust stream only when oxidizing agent injection is desired. When bypass 318 is in operation some oxidizing agent may go through the bypass 318 as well. When no oxidizing agent injector is available, or during periods where oxidizing agent is not being injected into the exhaust stream, power to heating elements 326 is adjusted to maintain downstream temperature 366 at a selected set point greater than 1500° F. (816° C.) to ensure complete oxidation of PICs and organic pollutants. During periods when oxidizing agent injector 350 is operating, power to heating elements 326 is adjusted to maintain downstream temperature 366 at a selected set point greater than 600° F. (316° C.), in order to ensure complete decomposition of oxidizing agent.

Referring again to FIGS. 9-11, the treated portion of the exhaust stream can pass through a ceramic bed such as the ceramic bed 28 in FIG. 1. In an embodiment of the method, ceramic bed is a catalytically active material, for example mullite, or coated with a material to provide a catalytically active surface.

Referring to FIG. 13, a method for reducing emissions of products of incomplete combustion in the exhaust stream of a wood burning apparatus is shown including, after passing at least a portion of the exhaust stream through reaction chamber 430, passing the exhaust stream through a heat recovery system 480.

Adjustable bypass control also helps with the problem of variable mass-flows from various fireplaces, woodstoves, and agricultural waste burners. Moreover, different jurisdictions have different emissions standards, so the operator can optimize the system to use minimum energy requirements to save money, but still use the same system produced to standard design. The use of a standard design reduces costs of manufacture and requires only a single certification.

Heating exhaust streams to greater than 1500° F. (816° C.) is critical where no oxidizing agent injection is used, and largely obviates any need for a catalyst bed. Temperatures greater than 1500° F. (816° C.) are effective for rapidly and completely oxidizing organic molecules in the exhaust streams and prevent buildup and fouling of surfaces. Preferably, for greatest effectiveness in mitigating emissions, exhaust streams should be heated to greater than 1500° F. (816° C.) (and to as high as can be attained considering material limitations and power requirements). Preferably the materials used for construction of the components are primarily stainless steel and ceramic, which can safely handle temperatures up to 2000° F. (1093° C.). Stainless steel and ceramic are also generally compatible with use of oxidizing agents, for example ozone, hydrogen peroxide and oxygen gas, in the event that oxidizing agents are injected when the emissions reduction system is below the temperature for labile decomposition. Other materials with high temperature limits and chemical compatibility may be used, for example many titanium alloys and certain high strength aluminum alloys.

Those skilled in the art will recognize that numerous modifications and changes may be made to the preferred embodiment without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the preferred embodiment is essential. Other embodiments are possible, their specific designs depending upon the particular application. As such, the scope of the invention should not be limited by the particular embodiments herein described but should be defined only by the appended claims and equivalents thereof.

I claim:

1. An emissions reduction system for a wood burning appliance having an exhaust flue, comprising:
   an inlet plenum connectable to said exhaust flue;
   an outlet plenum; and,
   a reaction chamber in fluid communication with said inlet plenum and said outlet plenum, said reaction chamber including a plurality of parallel reaction chamber channels, each reaction chamber channel comprising a tube having an inlet in fluid communication with the inlet plenum, an outlet in fluid communication with the outlet plenum and a heating element disposed in the tube.

2. An emissions reduction system as in claim 1, further comprising an oxidizing agent injector.

3. An emissions reduction system as in claim 2, wherein said oxidizer injector comprises:
   an oxidizer agent source; and,
   an injector distributor in fluid communication with said oxidizer agent source and having one or more discharge nozzles disposed between said appliance and said reaction chamber.

4. An emissions reduction system as in claim 3, further comprising an oxidizer injector controller in control communication with at least said oxidizer injector.

5. An emissions reduction system as in claim 3, wherein said oxidizing agent consists of one or more oxidizing agents selected from the group consisting of ozone, hydrogen peroxide, water, and high purity oxygen gas.

6. An emissions reduction system as in claim 3, wherein said injector distributor includes an annular distribution header having a plurality of discharge nozzles.

7. An emissions reduction system as in claim 6, wherein said distribution header is substantially aligned to said plurality of parallel reaction chamber channels.

8. An emissions reduction system as in claim 1, further comprising a reaction chamber adjustable-flow bypass, said bypass adjustable at least to the fully open and the fully shut positions.

9. An emissions reduction system as in claim 8, wherein said bypass further comprises:
   a central duct extending through the center of said reaction chamber in parallel with said plurality of parallel reaction chamber channels, and
   a movable bypass duct flow-adjustment damper disposed across said central duct.

10. An emissions reduction system as in claim 8, wherein said bypass further comprises:
    an annular duct surrounding said reaction chamber in parallel with said plurality of parallel reaction chamber channels, and
    a movable bypass duct flow-adjustment damper disposed across said annular duct.

11. An emissions reduction system as in claim 1, further comprising:
    an exhaust stream temperature sensor located downstream of said reaction chamber;
    an adjustable-flow reaction chamber bypass duct in fluid communication with said inlet plenum and said outlet plenum;
    a movable bypass duct flow-control damper;
    a bypass duct flow-control damper actuator operably connected to said bypass duct flow-control damper, said actuator adjustable through the range of damper-fully-open to damper-fully-closed; and,
    an emissions reduction system controller, said controller in control communication with at least said heating elements, said exhaust stream temperature sensor, and said damper actuator.

12. An emissions reduction system as in claim 11, further comprising:
    an oxidizing agent injector, said oxidizing agent injector including an oxidizer agent source, an injector distributor in fluid communication with said oxidizer agent source and having one or more discharge nozzles disposed between said appliance and said reaction chamber;
    wherein, said emissions reduction system controller is in control communication with at least said heating elements, said downstream temperature sensor, said damper actuator, and said oxidizing agent injector.

13. An emissions reduction system as in claim 11 or 12, further comprising a user interface in control communication with said emissions reduction system controller.

* * * * *